United States Patent
Keen

(10) Patent No.: US 11,176,203 B2
(45) Date of Patent: Nov. 16, 2021

(54) INTERACTIVE REPRESENTATION OF MULTI-DIMENSIONAL DATASETS

(71) Applicant: Ravelation Pty Ltd, Coogee (AU)

(72) Inventor: Steve Leslie Keen, Coogee (AU)

(73) Assignee: Ravelation Pty Ltd, Coogee (AU)

( * ) Notice: Subject to any disclaimer, the term of this patent is extended or adjusted under 35 U.S.C. 154(b) by 570 days.

(21) Appl. No.: 16/095,805

(22) PCT Filed: Apr. 27, 2017

(86) PCT No.: PCT/AU2017/050382
§ 371 (c)(1),
(2) Date: Oct. 23, 2018

(87) PCT Pub. No.: WO2017/185135
PCT Pub. Date: Nov. 2, 2017

(65) Prior Publication Data
US 2019/0129906 A1    May 2, 2019

(30) Foreign Application Priority Data

Apr. 27, 2016 (AU) ................................ 2016901546

(51) Int. Cl.
*G06F 16/904* (2019.01)
*G06F 16/28* (2019.01)
(Continued)

(52) U.S. Cl.
CPC .......... *G06F 16/904* (2019.01); *G06F 16/283* (2019.01); *G06F 16/9024* (2019.01); *G06F 17/175* (2013.01)

(58) Field of Classification Search
CPC ... G06F 16/9024; G06F 16/283; G06F 16/904
See application file for complete search history.

(56) References Cited

U.S. PATENT DOCUMENTS 7,283,137 B2   10/2007  Suyama et al.
8,335,998 B1 * 12/2012  Rubinger ................ G06F 16/93
                                                            715/855

(Continued)

OTHER PUBLICATIONS

International Search Report dated Jun. 28, 2017 for International Application No. PCT/AU2017/050382 filed Apr. 27, 2017, 4 pages.

(Continued)

*Primary Examiner* — Eliyah S. Harper
(74) *Attorney, Agent, or Firm* — McDonnell Boehnen Hulbert & Berghoff LLP

(57) ABSTRACT

Systems, methods, and data processing tools for processing a multi-dimensional dataset are disclosed. The method includes generating a data object linked to the multi-dimensional dataset. The data object includes a plurality of dimension controls, where each dimension control corresponds to a dimension of the multi-dimensional dataset, and each dimension control is an interactive axis extending radially from a central point. The method further includes displaying the data object in a first configuration, receiving user input manipulating at least one dimension control to change the configuration of the data object from the first configuration to a second configuration, and processing the input to determine an operation associated with the user input. Moreover, the method includes processing the linked multi-dimensional dataset in accordance with the determined operation to generate a display object depicting a dataset corresponding to the second configuration of the data object, and displaying the display object.

20 Claims, 22 Drawing Sheets

(51) Int. Cl.
 *G06F 16/901* (2019.01)
 *G06F 17/17* (2006.01)

(56) References Cited

U.S. PATENT DOCUMENTS

| | | |
|---|---|---|
| 8,793,619 B2 | 7/2014 | Roe et al. |
| 10,102,278 B2 * | 10/2018 | Polonsky .............. G06F 16/437 |
| 2004/0001608 A1 * | 1/2004 | Rhoads .............. G11B 20/0021 |
| | | 382/100 |
| 2004/0095349 A1 | 5/2004 | Bito et al. |
| 2006/0007123 A1 * | 1/2006 | Wilson .................. G06F 3/0425 |
| | | 345/156 |
| 2007/0244990 A1 * | 10/2007 | Wells .................... G06F 16/986 |
| | | 709/218 |
| 2008/0195930 A1 * | 8/2008 | Tolle ........................ G06F 40/18 |
| | | 715/227 |
| 2009/0254588 A1 | 10/2009 | Li |

OTHER PUBLICATIONS

Written Opinion dated Jun. 28, 2017 for International Application No. PCT/AU2017/050382 filed Apr. 27, 2017, 5 pages.

* cited by examiner

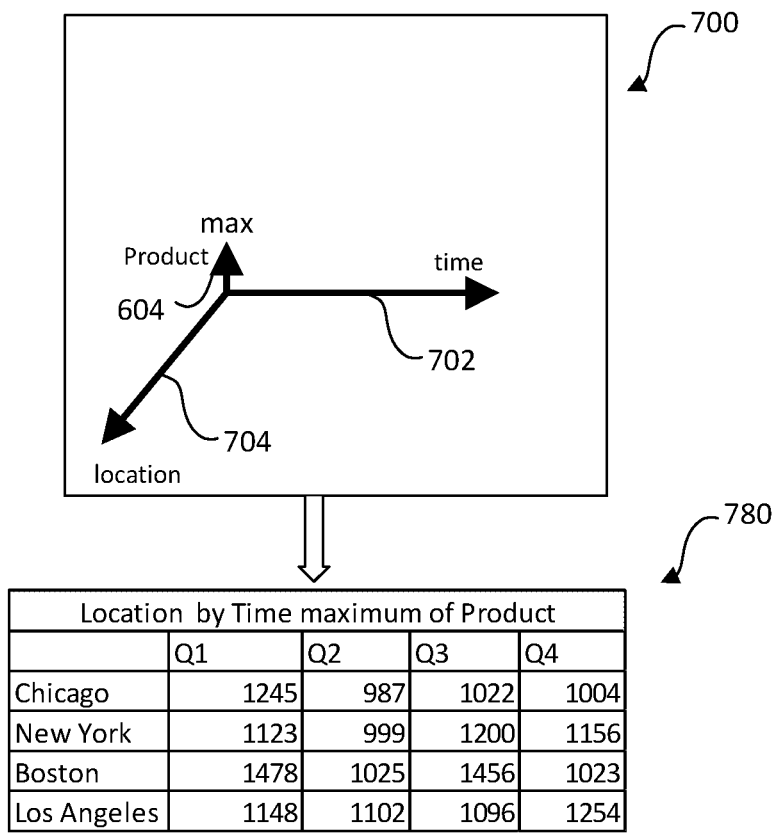
FIG. 7H
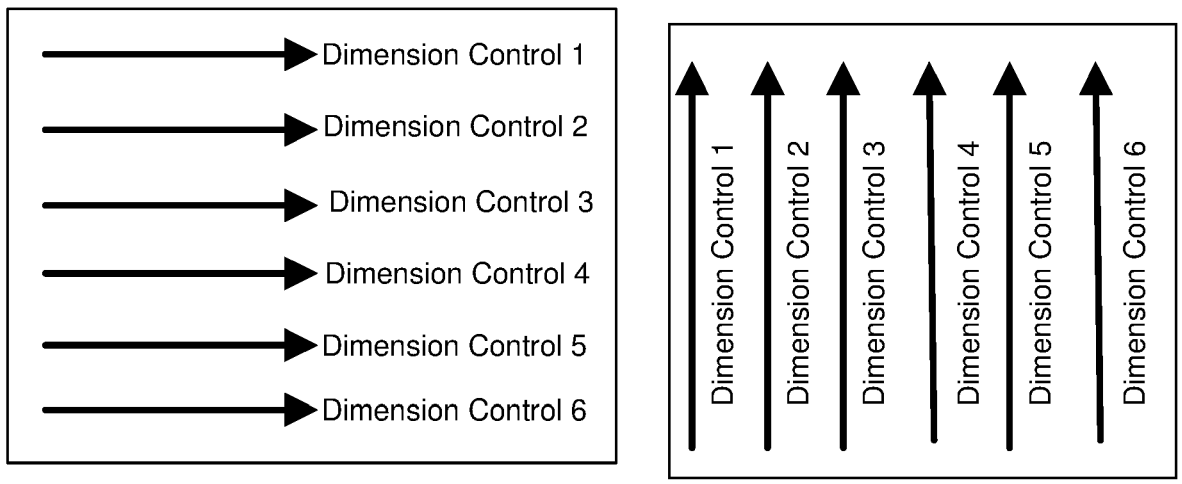
FIG. 8A
FIG. 8B

|   | A | B | C | D |
|---|---|---|---|---|
| 1 | Year | USA | UK | Australia |
| 1540 | 1962.167 | 454.8845 |  | 9.649246 |
| 1541 | 1962.25 | 456.421 |  | 9.682 |
| 1542 | 1962.333 | 460.0281 |  | 9.713908 |
| 1543 | 1962.417 | 464.811 |  | 9.745818 |
| 1544 | 1962.5 | 469.346 |  | 9.779 |
| 1545 | 1962.583 | 472.6359 |  | 9.813951 |
| 1546 | 1962.667 | 475.3914 |  | 9.848075 |
| 1547 | 1962.75 | 478.75 |  | 9.878 |
| 1548 | 1962.833 | 483.4306 |  | 9.902879 |
| 1549 | 1962.917 | 488.4784 |  | 9.931956 |
| 1550 | 1963 | 492.52 |  | 9.977 |
| 1551 | 1963.083 | 494.6867 |  | 10.04587 |
| 1552 | 1963.167 | 496.129 |  | 10.13077 |
| 1553 | 1963.25 | 498.502 | 16.345 | 10.22 |
| 1554 | 1963.333 | 502.9337 | 16.30988 | 10.3044 |

Debt Private

1554 | 1963.333 | 502.9337 | 16.30988 | 10.3044

Debt Household

1554 | 1963.333 | 502.9337 | 16.30988 | 10.3044

Debt Corporate

|   | A | B | C | D |
|---|---|---|---|---|
| 1 | Year | USA | UK | Australia |
| 2035 | 1959.417 | 520.6589 | 23.30101 |  |
| 2036 | 1959.5 | 524.2 | 23.44225 |  |
| 2037 | 1959.583 | 525.6602 | 23.58601 |  |
| 2038 | 1959.667 | 525.6629 | 23.73147 |  |
| 2039 | 1959.75 | 525.2 | 23.8778 |  |
| 2040 | 1959.833 | 525.2026 | 24.02416 |  |
| 2041 | 1959.917 | 526.3597 | 24.16973 |  |
| 2042 | 1960 | 529.3 | 24.31367 |  |
| 2043 | 1960.083 | 534.2148 | 24.45527 |  |
| 2044 | 1960.167 | 539.5464 | 24.59427 |  |
| 2045 | 1960.25 | 543.3 | 24.73053 |  |
| 2046 | 1960.333 | 544.1309 | 24.86391 |  |
| 2047 | 1960.417 | 543.2953 | 24.99427 |  |
| 2048 | 1960.5 | 542.7 | 25.12147 | 16.56981 |
| 2049 | 1960.583 | 543.6803 | 25.24536 | 16.71874 |

GDP

| | A | B | C | D | E | F | G | H | I | J |
|---|---|---|---|---|---|---|---|---|---|---|
| 1 | | Private Debt | | | GDP | | | Debt to GDP Ratios | | |
| 2 | Year | USA | UK | Australia | USA | UK | Australia | USA | UK | Australia |
| 2046 | 1960.25 | 393.312 | | 8.549 | 543.3 | 24.73053 | | 72.4% | 0.0% | #DIV/0! |
| 2047 | 1960.333 | 396.6414 | | 8.632051 | 544.1309 | 24.86391 | | 72.9% | 0.0% | #DIV/0! |
| 2048 | 1960.417 | 400.8042 | | 8.708389 | 543.2953 | 24.99427 | | 73.8% | 0.0% | #DIV/0! |
| 2049 | 1960.5 | 404.512 | | 8.782 | 542.7 | 25.12147 | 16.56981 | 74.5% | 0.0% | 53.0% |
| 2050 | 1960.583 | 406.874 | | 8.856526 | 543.6803 | 25.24536 | 16.71874 | 74.8% | 0.0% | 53.0% |
| 2051 | 1960.667 | 408.5897 | | 8.934222 | 545.287 | 25.36381 | 16.85401 | 74.9% | 0.0% | 53.0% |
| 2052 | 1960.75 | 410.756 | | 9.017 | 546 | 25.4799 | 16.98117 | 75.2% | 0.0% | 53.1% |
| 2053 | 1960.833 | 414.0629 | | 9.104439 | 544.7999 | 25.5958 | 17.10067 | 75.4% | 0.0% | 53.2% |
| 2054 | 1960.917 | 417.7318 | | 9.189796 | 542.6714 | 25.70407 | 17.21494 | 76.0% | 0.0% | 53.4% |
| 2055 | 1961 | 420.477 | | 9.252 | 541.1 | 25.81032 | 17.32584 | 76.6% | 0.0% | 53.4% |
| 2056 | 1961.083 | 421.5346 | | 9.292053 | 541.2497 | 25.91158 | 17.43271 | 77.0% | 0.0% | 53.3% |
| 2057 | 1961.167 | 421.9039 | | 9.315259 | 542.9978 | 26.00946 | 17.5225 | 77.7% | 0.0% | 53.2% |
| 2058 | 1961.25 | 423.016 | | 9.334 | 545.9 | 26.10475 | 17.57815 | 77.9% | 0.0% | 53.1% |
| 2059 | 1961.333 | 425.8603 | | 9.358054 | 549.32334 | 26.19823 | 17.58846 | 77.5% | 0.0% | 53.2% |
| 2060 | 1961.417 | 429.6258 | | 9.386796 | 553.2734 | 26.29067 | 17.56763 | 77.5% | 0.0% | 53.4% |
| 2061 | 1961.5 | 433.052 | | 9.417 | 557.4 | 26.38285 | 17.53631 | 77.6% | 0.0% | 53.7% |
| 2062 | 1961.583 | 435.2914 | | 9.440065 | 561.01358 | 26.47556 | 17.51044 | 77.6% | 0.0% | 53.9% |

GDP and Private Debt

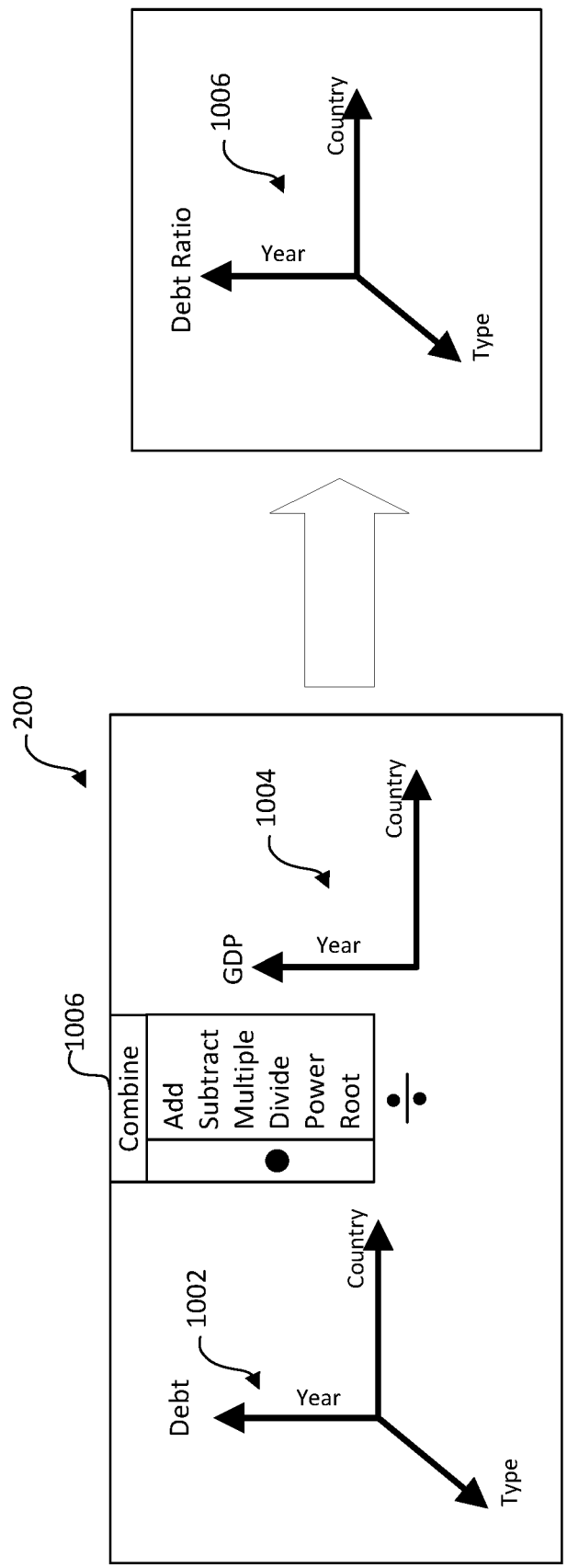

INTERACTIVE REPRESENTATION OF MULTI-DIMENSIONAL DATASETS

CROSS REFERENCE TO RELATED APPLICATIONS

This application is a U.S. national phase application under 35 USC 371 of International Patent Application No. PCT/AU2017/050382, filed Apr. 27, 2017, which claims the benefit of priority of Australian Patent Application No. 2016901546, filed Apr. 27, 2016.

TECHNICAL FIELD

Aspects of the present disclosure relate to processing multi-dimensional data and more specifically to a system, method, and tool for processing multi-dimensional data.

BACKGROUND

Typically, numerical data is analysed in spreadsheets. A spreadsheet is inherently a two dimensional or flat system, where data can be arranged in rows and columns. Each column represents a particular attribute of the data, for example, a store in a retail chain, and each row contains information on some related attribute, such as sales by store.

When a dataset is simple, i.e., when it has one or two dimensions storing, for example, sales by date of a single product, a spreadsheet may allow a user to easily view the dataset and carry out investigations.

However, when the dataset becomes complex, i.e., when it has three or more dimensions storing, for example, sales of multiple products by date from multiple stores, spreadsheets lack intuitive means to display and analyse the data. In this commonplace situation—an example of which is illustrated in FIG. 1—users often need to "drill down" into the spreadsheet data, or view the data in a different way. For instance, in the example illustrated above, analysing the trend over time in product sales involves aggregating sales across stores, thus collapsing the third dimension of the location of sales. Similarly, analysing regional patterns in total sales involves aggregating/collapsing the product dimension.

A spreadsheet is, therefore, of limited use for data with more than two dimensions.

This deficiency in spreadsheets led to the development of On-Line Analytic Processing (OLAP) databases/programs. An OLAP database allows for multiple dimensions rather than the two dimensions offered by spreadsheets. Moreover, OLAP databases allow data to be viewed along any two dimensions by using programming instructions. Although OLAP programs are far more powerful than spreadsheets, they have more complex structures, and manipulating these complex structures requires knowledge of complex programming commands.

Spreadsheets today—such as Microsoft Excel®—offer an implementation of an OLAP feature called a pivot table. Pivot tables allow users to view summarized information about an underlying dataset and to rearrange the dataset to view data along any two dimensions, perform statistical operations on the data, create charts from the data, and so on. However, pivot tables are not intuitive. Most users find pivot tables very difficult to use and master when the underlying dataset includes many attributes.

OLAP programs also use pivot tables as a means to structure data imported from transaction-recording databases.

SUMMARY

According to a first aspect, the present invention provides a method for processing a multi-dimensional dataset, the method including: generating a data object linked to the multi-dimensional dataset, the data object including a plurality of dimension controls, wherein each dimension control corresponds to a dimension of the multi-dimensional dataset, and each dimension control is an interactive axis extending radially from a central point; displaying the data object in a first configuration; receiving user input manipulating at least one dimension control to change the configuration of the data object from the first configuration to a second configuration; processing the input to determine an operation associated with the user input; processing the linked multi-dimensional dataset in accordance with the determined operation to generate a display object depicting a dataset corresponding to the second configuration of the data object; and displaying the display object.

According to a second, the present invention provides a computer processing system for manipulating a multi-dimensional dataset including: a computer processing unit; computer readable memory in communication with the computer processing unit, the computer readable memory including instructions executable by the computer processing unit to cause the computer processing system to: generate a user interface linked to the multi-dimensional dataset, the user interface including a data object including a plurality of dimension controls, where each dimension control corresponds to a dimension of the multi-dimensional dataset, and each dimension control is an interactive axis extending radially from a central point; display the data object in a first configuration; receive a user input manipulating at least one dimension control to change the configuration of the data object from the first configuration to a second configuration; process the input to determine an operation associated with the user input; process the linked multi-dimensional dataset in accordance with the determined operation to generate a display object depicting a dataset corresponding to the second configuration of the data object; and display the display object.

According to a third aspect, the present invention provides a data processing tool for manipulating multi-dimensional dataset, including: a user interface displaying a data object including a plurality of interactive axes radiating from a central point, each interactive axis corresponding to a single dimension of the multi-dimensional dataset; wherein each of the interactive axes is linked to a dimension of the multi-dimensional dataset and manipulation of an interactive axis of the data object causes the underlying multi-dimensional dataset to be processed according to the manipulation.

According to a fourth aspect, the present invention provides a method for performing a mathematical operation on a first dataset and a second dataset, the method including: generating and displaying a first data object linked to the first dataset, the first data object including a plurality of first data object dimension controls, wherein each first data object dimension control corresponds to a dimension of the first dataset, and wherein each first data object dimension control is manipulable by a user to modify the first dataset; generating and displaying a second data object linked to the second dataset, the second data object including a plurality of second data object dimension controls, wherein each second data object dimension control corresponds to a dimension of the second dataset, and wherein each second data object dimension control is manipulable by a user to modify the second dataset; receiving user input selecting a mathematical operation to be performed on the first and second datasets; and performing the mathematical operation on the first and second datasets to generate a combined dataset; and displaying the combined dataset in a display object.

Further aspects of the present invention and further embodiments of the aspects described in the preceding paragraphs will become apparent from the following description, given by way of example and with reference to the accompanying drawings.

BRIEF DESCRIPTION OF THE DRAWINGS

In the drawings:

FIG. 7H illustrates the data object of FIG. 7D with the product axis collapsed.

FIG. 8A illustrates an exemplary data object according to an aspect of the present disclosure.

FIG. 8B illustrates another exemplary data object according to an aspect of the present disclosure.

FIG. 9A is a table illustrating a three dimensional debt dataset.

FIG. 9B is a table illustrating a two dimensional GDP dataset.

FIG. 9C illustrates a combined spreadsheet.

FIG. 10A illustrates a user interface with two data objects.

FIG. 10B illustrates the user interface after a mathematical operation is performed on the two data objects of FIG. 10A.

Figures 1, 2A:
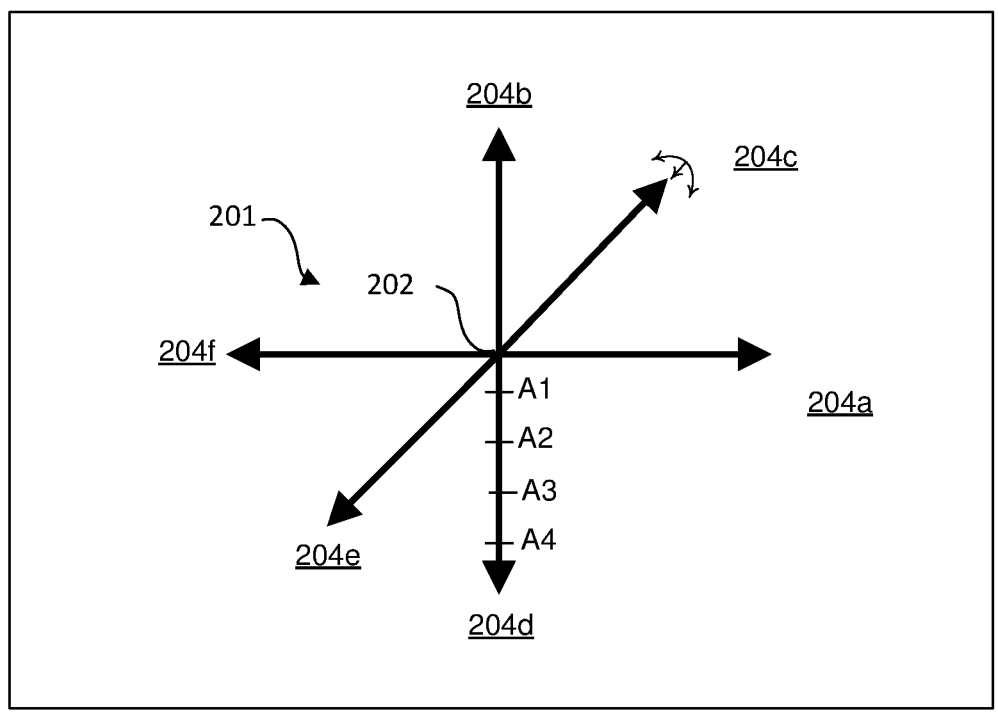
FIG. 1 is a spreadsheet depicting an example dataset for a retail chain.
FIG. 2A is a schematic diagram of a user interface of an exemplary data processing tool according to aspects of the present disclosure.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Overview

A dimension is a key aggregate descriptive attribute of a dataset—such as the records of all transactions by a major retailer—that enables users to analyse significant trends in that dataset. Some data in a dataset may be important for accounting purposes—such as customer names—but is generally insignificant for analysing trends. Such data is not typically considered as a key attribute, and does not constitute a dimension. However, other data fields that can be used to analyse trends, are considered as key attributes. These key attributes include, for example, demographic information (customer age range, sex, and location), product information (type of product, price range), or sales information (location of sale, month of sale). Data is aggregated in these key attributes to form a dimension. For example, customer addresses (key attribute) might be aggregated by zip-code (dimension), customer ages (key attribute) may be aggregated into a target segment (dimension) that includes key attributes such as pre-teen, teens, adults, senior, etc. The information to be analysed—which could be the dollar value of sales, the quantity sold, the number of customers—is then organized according to these dimensions, which form the axes of a multi-dimensional "cube". Spreadsheets are limited to a 2-dimensional cube, whereas the cube described here has seven dimensions: Customer age range, Customer sex, Customer location, Product type, Product price range, Store location, Sale Month.

Each dimension itself can include one or more associated dimensions. For instance, a time dimension may include sub-dimensions such as days, weeks, months, quarters, or years. Dimensions can thus support a hierarchy of detail that supports drilling down for finer detail analysis where necessary. Further, dimensions can include one or more attributes. For example, the dimension 'Store location' may include multiple attributes, each corresponding to a store of a multi-department or multi-city business.

Table 1 and FIG. 1 illustrate a simple example of a part of a retail chain dataset 100.

| Time | Product | Location | Units Sold |
|---|---|---|---|
| Q1 | Home Ent. | Chicago | 968 |
| Q1 | Appliances | Chicago | 1245 |
| Q1 | Phone | Chicago | 38 |
| Q1 | TV | Chicago | 1045 |
| Q2 | Home Ent. | Chicago | 987 |
| Q2 | Appliances | Chicago | 987 |
| Q2 | Phone | Chicago | 34 |
| Q2 | TV | Chicago | 756 |
| Q3 | Home Ent. | Chicago | 987 |
| Q3 | Appliances | Chicago | 875 |
| Q3 | Phone | Chicago | 45 |
| Q3 | TV | Chicago | 1022 |
| Q4 | Home Ent. | Chicago | 984 |
| Q4 | Appliances | Chicago | 987 |
| Q4 | Phone | Chicago | 35 |
| Q4 | TV | Chicago | 1004 |
| Q1 | Home Ent. | New York | 978 |
| Q1 | Appliances | New York | 1123 |
| Q1 | Phone | New York | 45 |
| Q1 | TV | New York | 1023 |
| Q2 | Home Ent. | New York | 999 |
| Q2 | Appliances | New York | 963 |
| Q2 | Phone | New York | 48 |
| Q2 | TV | New York | 745 |
| Q3 | Home Ent. | New York | 1008 |
| Q3 | Appliances | New York | 896 |
| Q3 | Phone | New York | 38 |
| Q3 | TV | New York | 1200 |
| Q4 | Home Ent. | New York | 957 |
| Q4 | Appliances | New York | 899 |
| Q4 | Phone | New York | 42 |
| Q4 | TV | New York | 1156 |
| Q1 | Home Ent. | Boston | 952 |
| Q1 | Appliances | Boston | 1478 |
| Q1 | Phone | Boston | 36 |
| Q1 | TV | Boston | 1156 |
| Q2 | Home Ent. | Boston | 1001 |
| Q2 | Appliances | Boston | 1025 |
| Q2 | Phone | Boston | 46 |
| Q2 | TV | Boston | 789 |
| Q3 | Home Ent. | Boston | 1048 |
| Q3 | Appliances | Boston | 963 |
| Q3 | Phone | Boston | 59 |
| Q3 | TV | Boston | 1456 |
| Q4 | Home Ent. | Boston | 1007 |
| Q4 | Appliances | Boston | 1023 |
| Q4 | Phone | Boston | 46 |
| Q4 | TV | Boston | 1009 |
| Q1 | Home Ent. | Los Angeles | 912 |
| Q1 | Appliances | Los Angeles | 1126 |
| Q1 | Phone | Los Angeles | 54 |
| Q1 | TV | Los Angeles | 1148 |
| Q2 | Home Ent. | Los Angeles | 1006 |
| Q2 | Appliances | Los Angeles | 1102 |
| Q2 | Phone | Los Angeles | 54 |
| Q2 | TV | Los Angeles | 854 |
| Q3 | Home Ent. | Los Angeles | 987 |
| Q3 | Appliances | Los Angeles | 952 |
| Q3 | Phone | Los Angeles | 46 |
| Q3 | TV | Los Angeles | 1096 |
| Q4 | Home Ent. | Los Angeles | 1023 |
| Q4 | Appliances | Los Angeles | 1100 |
| Q4 | Phone | Los Angeles | 58 |
| Q4 | TV | Los Angeles | 1254 |

This dataset 100 is three-dimensional, including dimensions time, product, and locations. Each dimension further includes attributes. The time dimension includes the attributes Q1, Q2, Q3, and Q4, the product dimension includes the attributes home entertainment sets, appliances, phones and televisions, whereas the location dimension 16 includes the attributes Chicago, New York, Boston, and Los Angeles. This dataset reveals total units sold by the retail chain per store per product and per quarter.

Dataset 100 shows three dimensions with each dimension having four attributes. However, in reality, the dataset for a retail chain would have additional dimensions, and many more attributes, which considerably increase the size and complexity of the dataset. With such large and complex datasets, users may often wish to drill-down or rearrange the data to answer some specific business questions. For example, the user may wish to view the number of televisions sold in each store for a particular week or the total sales figures for each retail store over the year. Alternatively, the user may wish to view a summary of the data in a chart. To allow the user to easily perform such actions on multi-dimensional data, aspects of the present disclosure present a data processing tool. The tool allows a user to easily manipulate and analyse multi-dimensional data by producing an intuitive graphical representation of the underlying data as its primary view.

Specifically, the data processing tool of the present disclosure provides a user interface, which uses a data object to represent underlying data. A data object includes interactive dimension controls corresponding to dimensions of the underlying dataset. Users can manipulate these interactive dimension controls to perform various operations on the underlying dataset. For example, the interactive dimension controls can be manipulated to rearrange or drill-down into the underlying dataset, to perform mathematical operations on the dataset (which, in turn, results in new data being generated), and to display the processed data in charts or tables. The presently disclosed tool is intuitive, requires no programming skills, and is easy to use even for beginners. Various aspects of the data processing tool will be described in detail with reference to FIGS. 2-14.

User Interface

FIGS. 2A-to 2E illustrate various aspects of an exemplary user interface 200 for manipulating data. The user interface 200 includes multiple controls. These controls include dimension controls, dropdown menus, pop-up menus, pointers, and sliders. Use of these controls will be described in detail below, though it should be noted that not all embodiments require all controls to be provided.

Referring to FIG. 2A, the user interface 200 includes a data object 201 including a set of dimension controls. In the present embodiments dimension controls are represented as interactive axes/arrows that extend radially from a central point 202 and point outwardly in different directions. In FIG. 2A: interactive axis 204a points to the right, interactive axis 204b points up, interactive axis 204c points forwards, interactive axis 204d points down, interactive axis 204f points left and interactive axis 204e points backwards. Each interactive axis represents a dimension of the underlying data, and each interactive axis can be independently moved to point in any of the six directions. In the illustrated examples, the up, right and forward axes (e.g., axes 204a-204c) are considered foreground dimension controls, whereas the down, left and back axes (e.g., axes 204d-204f) are considered background dimension controls. In other examples, the down, left and back axes may be considered foreground dimension controls whereas the up, right and forward axes are considered background dimension controls. Where the data object includes three or less interactive axes all axes are, effectively, foreground dimension controls. It will be appreciated that in yet other examples, any combination of axes may be considered to be foreground dimension controls (e.g., the up, right and back axes) and any other combination may be considered background axes (forward, down and left) without departing from the scope of the present application.

While FIG. 2A depicts a data object 201 for a dataset having six dimensions, it will be appreciated that datasets having smaller number of dimensions can be represented with data objects 201 having smaller number of dimension controls. Thus a single value (a "scalar") is displayed as a small cube; one-dimensional data (for example, a list of store names) can be displayed as a data object having a single foreground dimension control (up-facing or right-facing); a two-dimensional dataset (for example, storing products available for sale by store) can be displayed as a data object having two foreground dimension controls: one pointing up and the other pointing right.

Additional dimension controls can be added to data objects for datasets having more than six dimensions. For example, dimension controls in excess of six can be displayed either in a larger axes cluster, or as "greyed-out" mini-axes emanating from the point of intersection of the large axes (a representation technique that allows additional dimension controls to be displayed).

The data represented by the data object 201 is displayed by attaching a display object to the user interface 200—such as a chart or table—which displays a slice of the underlying dataset. The slice of data that is shown is determined (a) by the foreground dimension controls; and (b) by selection and consolidation operations that are applied to each of the interactive axes. If the display tool is a table, then the right axis is represented by the columns of the table, and the up axis is represented by the rows of the table.

If a two dimensional display object is attached, the information that is displayed is determined by two of the foreground dimension controls (such as the right and up axes), whereas if a three-dimensional display object is attached—such as a 3 dimensional chart—then the information that is displayed is determined by all three of the foreground dimension controls (such as the right, up, and forward axes).

The manipulations that can be applied to the data using the tool include rotating and swapping axes (to determine what is displayed in the display object), collapsing (to aggregate data on particular dimensions), deleting, adding, filtering, slicing, dicing or sorting. These will be described in turn with reference to FIGS. 2B-2F.

Figure 2B:
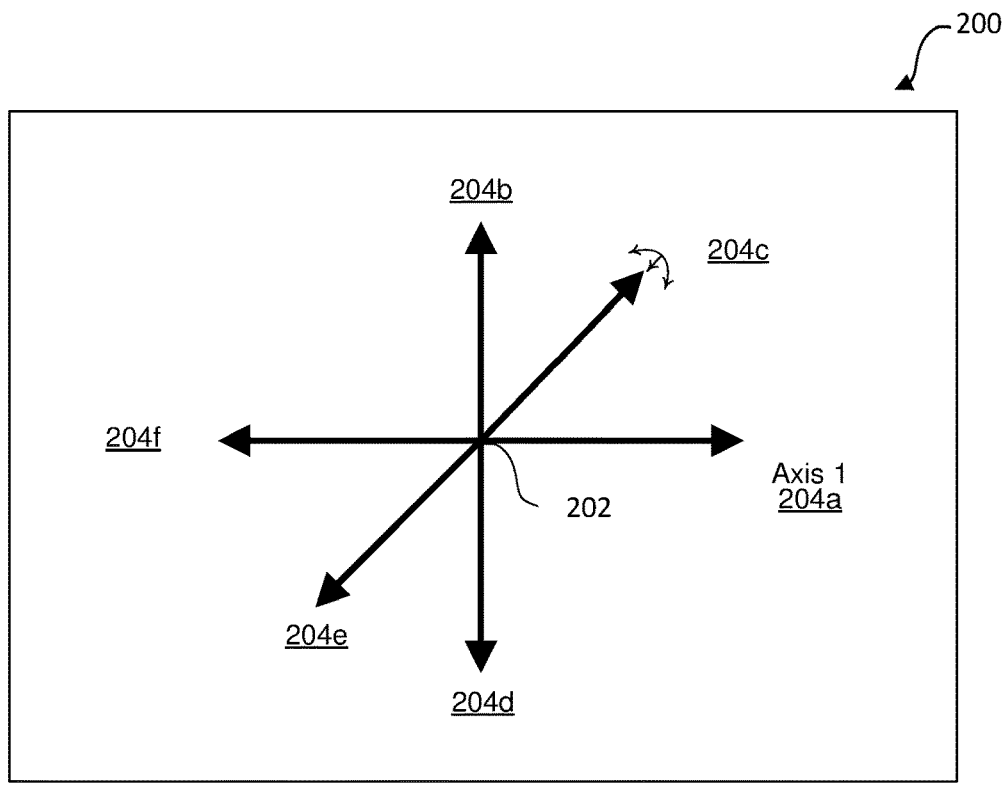
FIG. 2B illustrates the user interface of FIG. 2A with swapped interactive axes.

The user interface 200 allows a user to rearrange the underlying dataset, by swapping the positions of the interactive axes. The swapping may be affected by rotating an interactive axis clockwise or anti-clockwise about the central point 202 from its distal endpoint. Generally speaking, interactive axes may be swapped to replace a background dimension control with a foreground dimension control or vice-versa, or to change the display order of foreground dimension controls. FIG. 2B illustrates the user interface 200 with the positions of the interactive axes 204a and 204c swapped as compared to FIG. 2A. In one aspect, the positions of a first axis and a second axis can be swapped by selecting the first axis, for example, by touching or clicking on the axis near its distal endpoint, dragging the axis in a desired direction towards the second axis, and releasing the first axis once it is substantially superimposed or within a predetermined vicinity of on the second axis. This automatically swaps the positions of the first and second axis in the user interface 200. Alternatively, the axes 204 may be swapped by selecting both the axes, right-clicking to reveal a pop-up menu (not shown) and selecting a 'swap' option from the menu. A person skilled in the art will appreciate that swapping two axes 204 can be performed in a number of different ways and any of those techniques may be utilized without departing from the scope of the present disclosure.

The attributes of a dimension are positioned along the length of the corresponding interactive axis 204. For instance, if a dimension includes four attributes, the corresponding interactive axis includes four equidistant points, each corresponding to a particular attribute. The attributes may be arranged along the axis in alphabetical order, numerical order, or in the order in which the attributes are displayed in the underlying dataset.

In some aspects, the attributes of a dimension are depicted along the interactive axis associated with that dimension. For example, if Axis 4 (204d) has four attributes, A1, A2, A3, and A4, this could be displayed as shown in FIG. 2A. Alternatively, only the names of selected attributes are depicted, whereas the other attribute names are hidden.

Figure 2C:
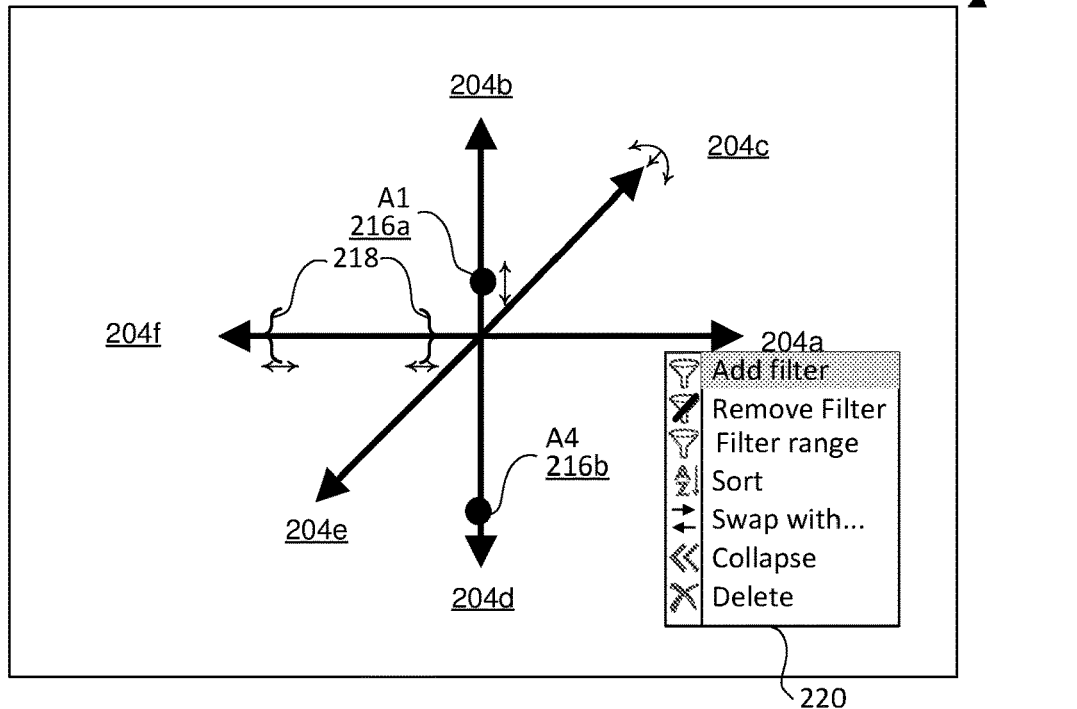
FIG. 2C illustrates the user interface of FIG. 2B with a pop-up menu to add a dimension filter.

The user interface 200 allows a user to filter a given dimension in the underlying dataset by a particular attribute (commonly referred to as slicing), or by a range of attributes (commonly referred to as dicing). Particularly, a dimension can be filtered by adding a filter control to the interactive axis 204 for that dimension. Dimension filter controls can be added to multiple dimensions. FIG. 2C provides three examples of dimension filter controls: filter control 216a associated with a single attribute (attribute A) of the dimension represented by axis 3 (204c); filter control 216b associated with a single attribute (attribute A4) of the dimension represented by axis 4 (204d); and filter controls 218 associated with a range of attributes (attributes A1 to A3) of the dimension represented by axis n (204n).

Dimension filter controls may be added in various ways. For example, a user may add a filter control to an interactive axis by selecting the axis, right-clicking to reveal a pop-up menu (such as pop-up menu 220), and selecting an 'add dimension filter' option as depicted in FIG. 2C. A dimension filter control may be removed from an axis in a similar manner. In another example, a dimension filter control may be added to an interactive axis by swapping the position of the axis with another axis that includes a filter control. Once a dimension filter control 216 is added to an axis, a visual indication of the filter control is displayed (e.g. by circles or brackets as shown in FIG. 2C or an alternative indicator). A user may change the attribute associated with a dimension filter control 216 by sliding the filter controls 216 or 218 along the axis. Alternatively, a dimension filter control may be associated with an attribute by dragging and dropping a control 216 onto a selected attribute, or by simply clicking on/selecting a particular position on the interactive axis, in which case the dimension filter control is moved to that position and associated with the attribute represented by that position. In one aspect, when a dimension filter control 216 is added to an interactive axis 204 it is associated with a default attribute and positioned on the interactive axis 204 at a position corresponding to that attribute. For example, the default attribute may be the attribute associated with the position on the interactive axis 204 that is closest to the central point 202.

As noted above, the user interface 200 also allows a user to filter a given dimension by a range of attributes rather than a single attribute. Any suitable technique may be utilized to allow a user to select a range. For instance, the user may right-click on an axis to reveal the pop-up menu 220 and select a 'add dimension range filter' option. This selection may subsequently reveal a range selection input form or display a dimension filter control in the form of two interactive brackets 218 or circles on the corresponding interactive axis (see FIG. 2C). A user can either enter the selected range in the input form or slide the brackets 218 along the axis to select a range of attributes. A person skilled in the art will appreciate that various other known methods may be utilized to select a range of attributes for a particular interactive axis and all of these methods are within the scope of the present disclosure.

Figure 2D:
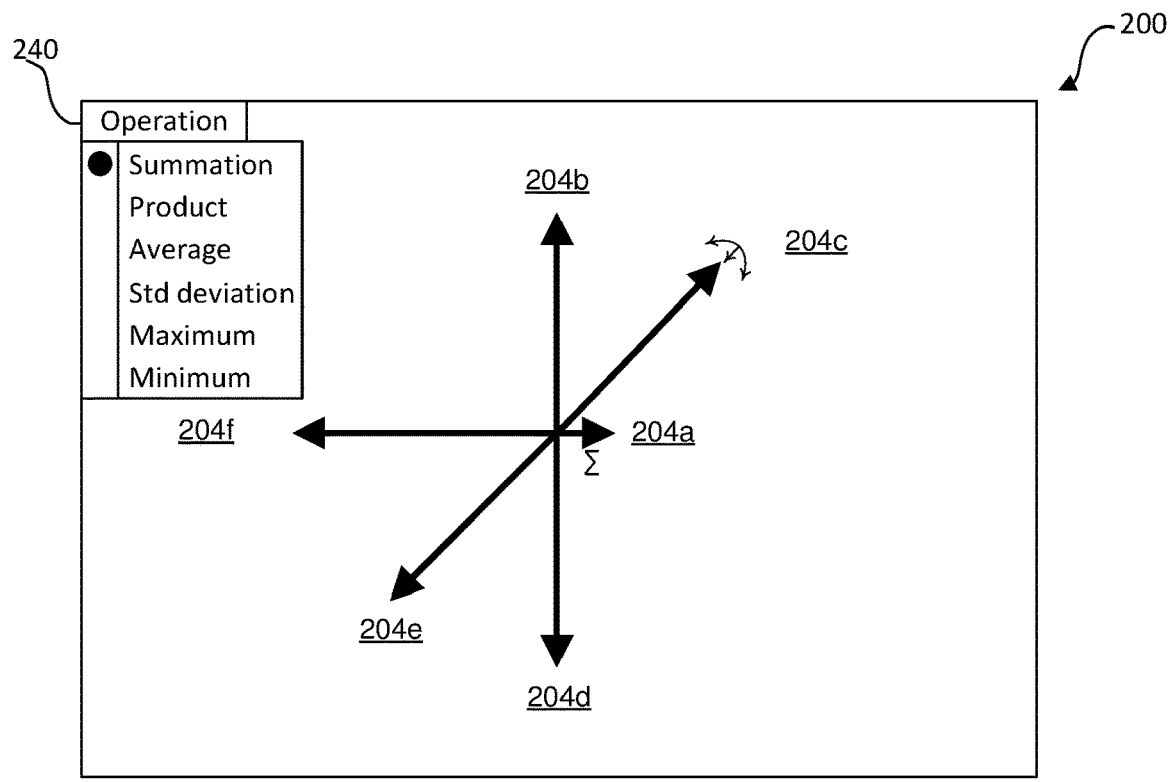
FIG. 2D illustrates the user interface of FIG. 2B with a collapsed interactive axis.
Figure 2E:
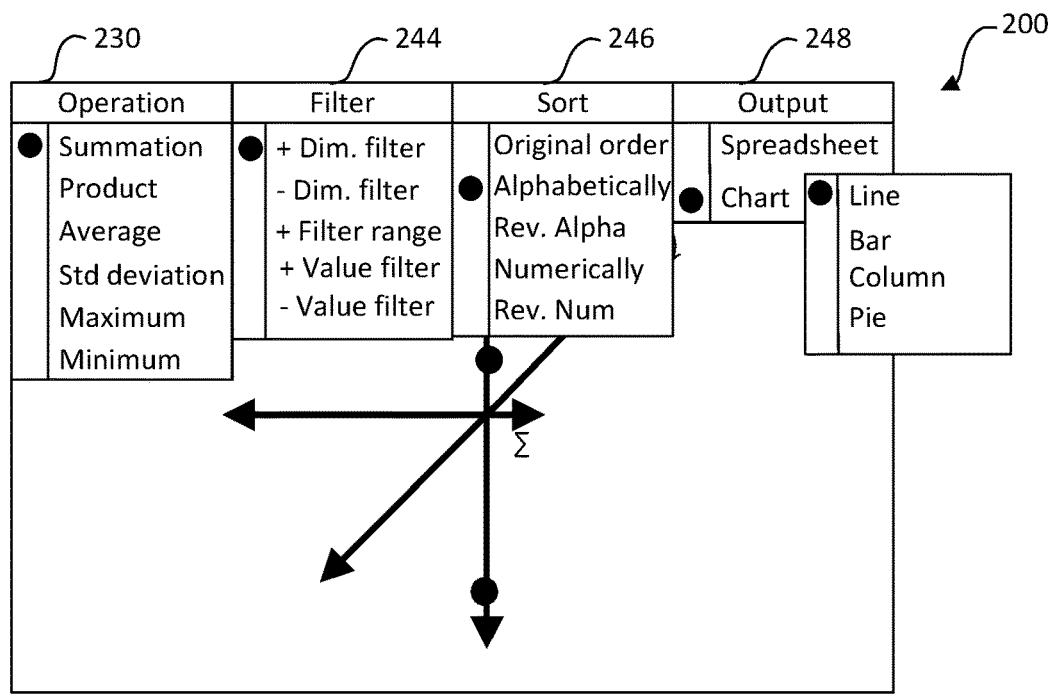
FIG. 2E illustrates the user interface of FIG. 2B with drop-down menus.
Figure 2F:
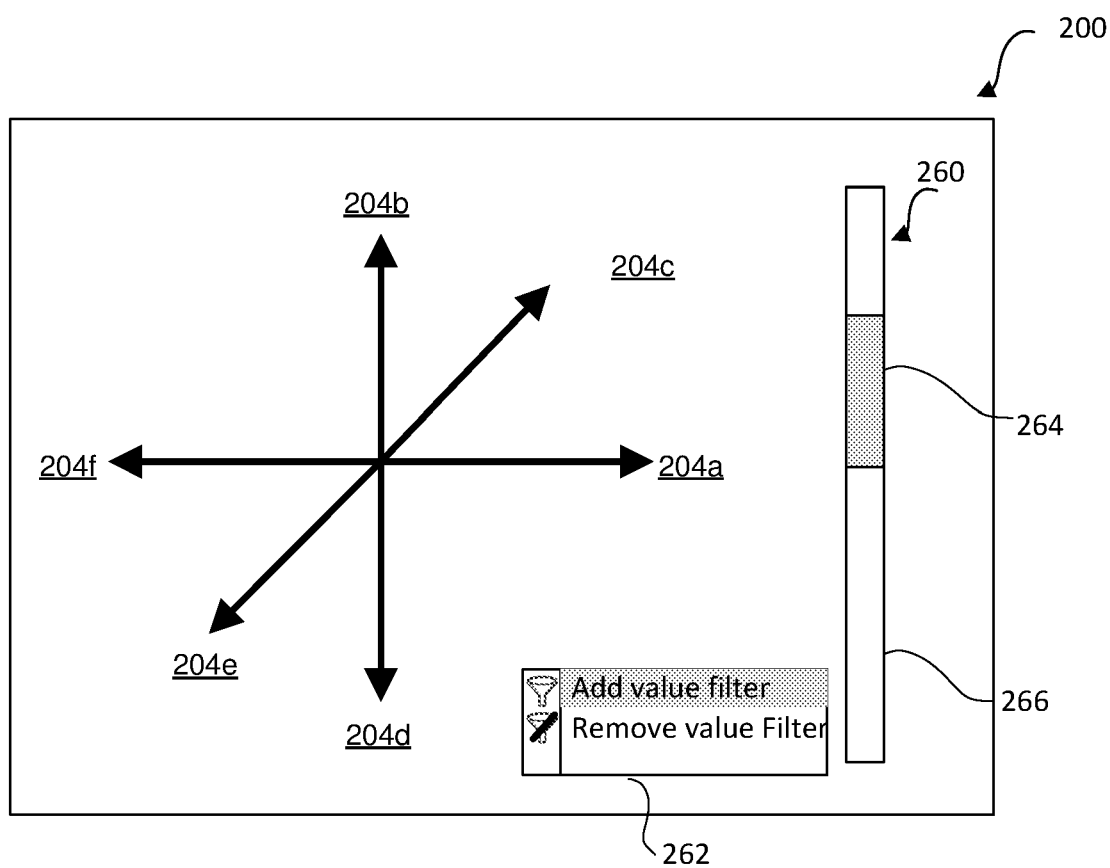
FIG. 2F illustrates the user interface of FIG. 2B with a value filter control.

The user interface 200 also allows a user to filter the underlying dataset by values. Particularly, the dataset may be filtered by adding a value filter control to the user interface 200. FIG. 2F provides an example of a value filter control: filter control 260 associated with the values of the underlying dataset.

Value filter controls may be added in various ways. For example, a user may add a value filter control by right-clicking in the user interface 200 to reveal a pop-up menu (such as pop-up menu 262), and selecting an 'add value filter' option as depicted in FIG. 2F. A value filter control 260 may be removed from an axis in a similar manner. Once a value filter control 260 is added to an axis, a visual indication of the filter control is displayed (e.g. by depicting a resizable vertical slider 264 in a track 266 as shown in FIG. 2F, a resizable horizontal slider in a horizontal track, or any other alternative indicator). The track 266 represents the total range of values in the underlying dataset. For example, the top of the track may represent the lowest value in the underlying dataset and the bottom of the track may represent the highest value in the underlying dataset and the length in between the top and bottom ends represents the values from the lowest to the highest values. Further, the slider 264 may be sized to match the range of values the user wishes to filter. For example, if the user wishes to filter the dataset to reveal a larger range of values, the slider 264 can be lengthened (e.g., by dragging an end of the slider 264 away from the slider). Alternatively, if the user wishes to filter the dataset to reveal a smaller range of values, the slider can be shortened (e.g., by dragging an end of the slider 264 towards the slider). Further, a suitable range may be selected by sliding the slider 264 along the length of the track 266. By resizing and/or sliding the slider 264, any range of values can be selected.

Furthermore, the user interface allows a user to perform mathematical operations with respect to a dimension by collapsing the interactive axis 204 associated with that dimension and selecting a desired mathematical operation. FIG. 2D illustrates the user interface 200 with the axis 204*a* collapsed with a 'summation' mathematical operation selected from a pop-up menu 240. The interactive axis 204*a* can be collapsed in various ways, for example by double-clicking on the axis, by right-clicking on the axis to reveal a pop-up menu and selecting a 'collapse' option from the pop-up menu (see pop-up menu 220 in FIG. 2C), or dragging each of the axis towards the central point 202, and so on. The mathematical operation may be selected from the pop-up menu 240, which is displayed automatically once the axis is collapsed. The mathematical operations may include, for example, summation, product, average, standard deviation, minimum, or maximum.

In some aspects, the user interface 200 allows a user to sort the attributes of a given dimension in the underlying data by changing the position of the attributes along the interactive axis 204 for that dimension. This sorting results in the underlying data being processed and redisplayed in the display object in accordance with the new order. Attributes may be sorted based on alphabetical order, reverse alphabetical order, numerical order, reverse numerical order, or a custom order. To sort the attributes associated with of an axis, a user may, for example, right-click on an interactive axis to reveal the pop-up menu 220 (FIG. 2C) and select the 'sort' option 222 in the menu. This might reveal a second pop-up menu with a list of sorting options including alphabetical order, reverse alphabetical order, numerical order, and reverse numerical order. To sort the attributes according to a custom order, the user may select a displayed attribute, for example attribute A3 in FIG. 2A, and drag that attribute to another position on axis 4, for example towards the position of attribute A4, and dropping the attribute at the new location. This would, in effect, swap the positions of the two attributes A3 and A4 on the interactive axis 4 and consequently sort the underlying dataset to reveal the attributes in the order A1, A2, A4, and A3.

The user interface 200 can also allow users to add or delete dimensions in the underlying dataset by adding or deleting one or more interactive axes. One way to delete an axis 204 is by right-clicking on the axis to reveal the pop-up menu 220 and selecting the 'delete' option from the menu. In a similar fashion, an interactive axis can be added to the user interface 200 by, for example, right clicking anywhere on the user interface 200 to reveal the pop-up menu 220 and selecting an 'add new' option from the pop-up menu (not shown). This launches a further data control, such as an input form or a new pop-up menu (not shown) displaying additional dimensions.

Instead of configuring pop-up menus for the above-identified manipulations, the user interface 200 may include permanent drop-down menus. FIG. 2E illustrates an example user interface 200 with multiple drop-down menus for the different manipulations. The menus include an operations menu 230, filter menu 244, sort menu 246, and output menu 248. The operations menu 230 allows a user to select a particular mathematical operation, the filter menu 244 allows a user to add a dimension filter (such as a single attribute filter or attribute range filter) or a value filter, whereas the sort menu 246 displays the various sorting options for sorting attributes of a dimension. The output menu 248 allows a user to select the display object they would like to generate—table and/or chart. If the user selects, chart, a second pop-up menu presents various charting options, such as a line, bar, column, or pie chart. The user interface 200 may also include a miscellaneous menu (not shown), which could allow the user to add or delete an axis, rename an axis, and so on. Furthermore, the output menu 248 may include options (not shown) that allow a user to save, print, or send the display objects or generate a report from the display objects.

Data Processing Tool

The user interface described above allows a user to perform various operations on the underlying dataset. For example, if a user selects an attribute in an interactive axis using a dimension filter control, the tool slices the underlying dataset to reveal data for that particular attribute. Conversely, if a dimension filter control is used to select a range of attributes from a particular interactive axis, the tool can dice the underlying dataset to show values for that range of attributes. If a value filter control is selected, the underlying data is filtered based on the range of values selected in the value filter control. If an axis is collapsed, the tool can perform a selected mathematical operation such as summation, product, average, standard deviation, maximum or minimum, on the dimension corresponding to the collapsed axis. Alternatively, if an interactive axis is deleted, the tool can remove the corresponding dimension from consideration in the underlying dataset. If a user swaps an interactive axis with another axis, the underlying dataset can be rearranged. Therefore, by determining the manipulation type of the user interface 200, the tool can perform multiple actions on the underlying dataset in an intuitive way.

Figure 3:
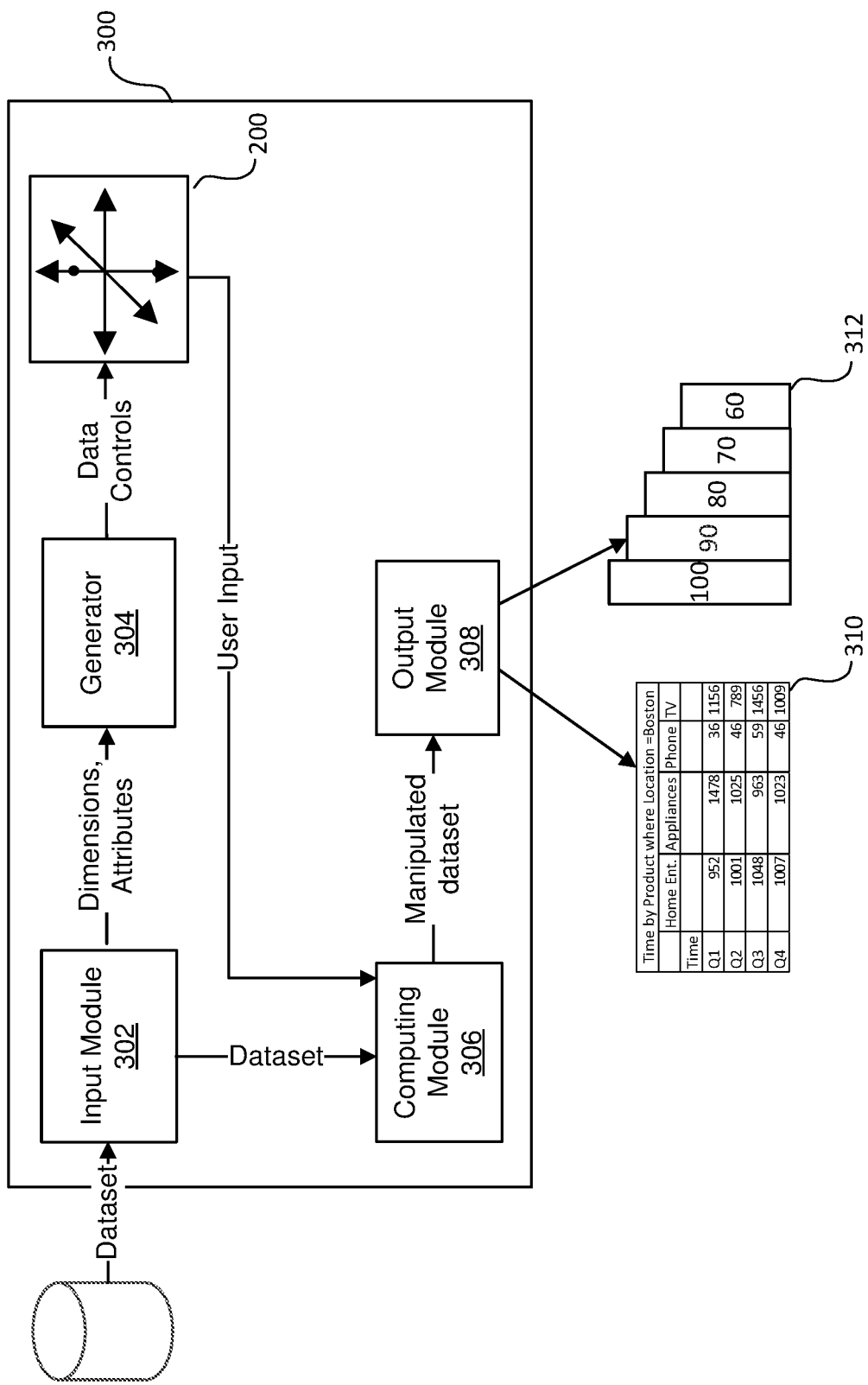
FIG. 3 is a block diagram of an exemplary data processing tool according to aspects of the present disclosure.

FIG. 3 is a block diagram of an exemplary data processing tool 300 according to aspects of the present disclosure. The data processing tool 300 includes an input module 302, a generation module 304, a computing module 306, an output module 308, and the user interface 200.

The input module 302 is configured to retrieve or access multidimensional datasets, detect dimensions, attributes and values from the retrieved datasets, and pass the retrieved multi-dimensional datasets to the computing module 306 and the identified dimensions and attributes to the generation module 304. The input module 302 may access the datasets from a single file or multiple files stored in a database. In some aspects, the dimensions, attributes, and values are detected from metadata of the datasets. In case of spreadsheets, the input module 302 may automatically detect dimensions from the row and/or column headers in a spreadsheet dataset, attributes of the dimension may subsequently be determined from related headers, whereas the values may be determined from the non-header cells of the spreadsheet. Alternatively, the detection may be semi-automatic, i.e., the input module may detect one or more dimensions and/or attributes but a user may be able to change the dimensions and/or attributes or specify different dimensions. In another aspect, the detection may be manual, i.e., a user may be requested to specify the dimensions, attributes, and/or values.

The generation module 304 is configured to generate the user interface 200 and one or more data objects based on the identified dimensions and attributes. For example, if four dimensions are identified from a dataset, the generation module 304 generates a data object having four dimension controls in the user interface 200. In one aspect, dimension controls are displayed as interactive axes 204 extending radially from a central point 202 as described in detail above. Furthermore, attributes of the dimensions may be arranged along the corresponding interactive axes 204. In other aspects, the dimension controls may be displayed as other interactive controls without departing from the scope of the present disclosure.

The computing module 306 is configured to receive user inputs from the user interface and process the multi-dimensional dataset based on the received user inputs. For example, if the computing module 306 receives a user input indicating that a dimension control is collapsed and a summation mathematical operation is to be performed, the computing module 306 performs the selected mathematical operation on the values corresponding to the dimension linked to the collapsed data control. The various actions performed by the computing module on the underlying dataset are described in detail with reference to FIG. 6.

The computing module 306 forwards the processed dataset to the output module 308, which is configured to generate a display object based on the processed dataset. In one aspect, the output module may render the display object within the user interface 200. Alternatively, the output module 308 may be configured to render the display object in a different user interface, in one of the files from which the dataset was retrieved, or in a new file. The display object may be rendered as a table 310 and/or a chart 312 depending on the selection made in the output menu 248 of the user interface 200. In addition, the output module 308 may be configured to display menu options that allow a user to save, print, or email the display objects or generate a report from the display objects.

Computing System

Figure 4:
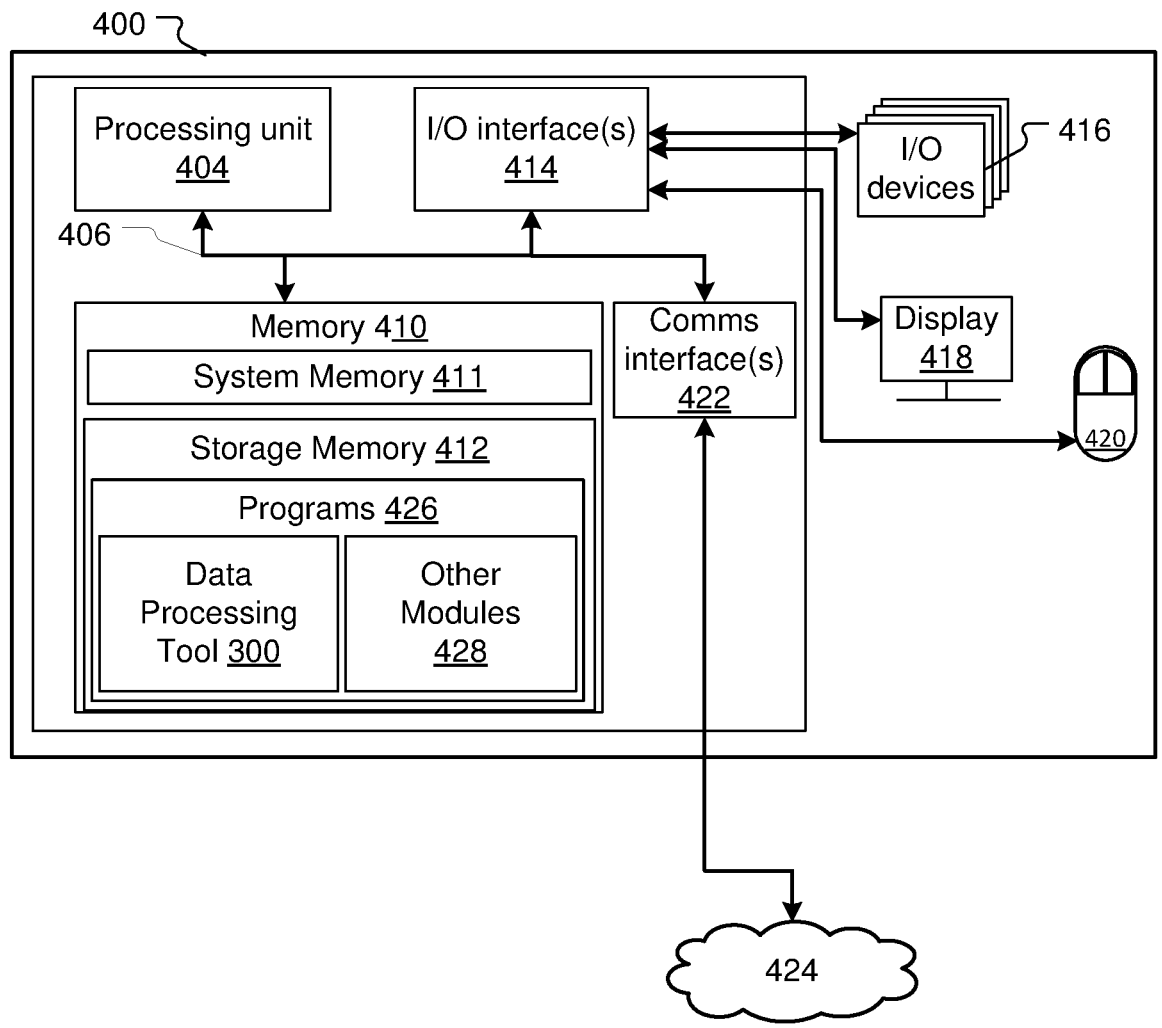
FIG. 4 is a block diagram of an exemplary computer system, which may be used to implement the various embodiments of the present disclosure.

FIG. 4 is a block diagram of a computing system 400, which, in certain embodiments, may be utilized to provide and operate the data processing tool 300. The computing system 400 may be, for example, a general purpose computing device, a server device, a laptop, a mobile computing device and so on. The system 400 includes at least one processing unit 404, communication interface 422, input/output interface 414, and memory 410. These components are interconnected by a system bus 406.

The processing unit 404 may be a single computational processing device (e.g. a microprocessor, a general processing unit, a graphical processing unit, or other computational device) or a plurality of computational processing devices.

The memory 410 includes a system memory 411 (e.g. a read only memory (ROM) storing a BIOS for basic system operations), storage memory 412 including computer readable volatile memory (e.g. random access memory such as one or more DRAM modules), and computer readable non-transient memory (e.g. one or more hard disk drives, solid state drives, flash memory devices and suchlike). The memory 412 stores information and instructions to be executed by the processing unit 404. The system memory 411 may be used for storing temporary variables or other intermediate information during execution of instructions to be executed by the processor. Such instructions when stored in the system memory 411 render computing system 400 into a special-purpose machine that is customized to perform the operations specified in the instructions.

When instructions are executed in sequence to perform a specific function, the set of instructions may be called program modules, applications, or instruction sets. Storage memory 412 includes multiple such program modules 426, which when executed cause the computing system 400 to generate and manipulate multi-dimensional data. In the illustrated embodiment, the program modules 426 include, for example, the data processing tool 300 and other program modules 428, which for example, provide a runtime environment, enable networked communications between multiple users, etc.

The I/O interface 414 allows the computing system 400 to interface with various input/output devices 416 and may include, for example, a port to interface with a pointing device 420, a port to interface with a keyboard 419, a port to interface with a display 418, a port to interface with a microphone, and a port to interface with a speaker, to name a few.

As used herein a pointing device 420 is a device which provides input in the form of spatial data. The pointing device 420 includes cursor control devices such as a mice, touch-pads, track-balls, pointing sticks, and joysticks which are used to control the position of a cursor or pointer displayed on a display and interact with displayed objects (e.g. by clicking on a graphical user interface element displayed at the position of the pointer/cursor). As used herein, pointing devices 420 also include devices such as touchscreens in which a user contacts (with either a finger or stylus) a touch sensitive screen positioned over a display to interact directly with graphical user interface elements (e.g. by tapping the touch screen at the position at which a graphical user interface element is displayed).

In a preferred implementation, a user utilizes the pointing device or touchscreen to manipulate the data objects 201 in the user interface 200. Alternatively, the user may utilize the keyboard 419 to manipulate the user interface 200. Furthermore, the output module 308 may display the user interface 200 and the processed dataset on the display 418.

The communication interface 422, such as a Network Interface Card (NIC), is operated to provide wired or wireless connection to one or more communication networks 424. Networks 324 that computing system 400 can connect to may include, for example, the Internet, local area networks, wide area networks, and/or other networks. Via the communications interface(s) 422 and network(s) 424, computer processing system 300 can communicate with other computer systems connected to the network 424.

Methods for Manipulating Multi-Dimensional Data

Exemplary methods 500 and 600 for manipulating multi-dimensional data are described next in the general context of computer executable instructions. The methods may be performed in a single computing device, such as computing system 400 or in a distributed computing environment where functions are performed by remote processing devices that are linked through a communication network 424. In a distributed computing environment, computer executable instructions may be located in both local and remote computer storage media, including memory 410.

Figure 5:
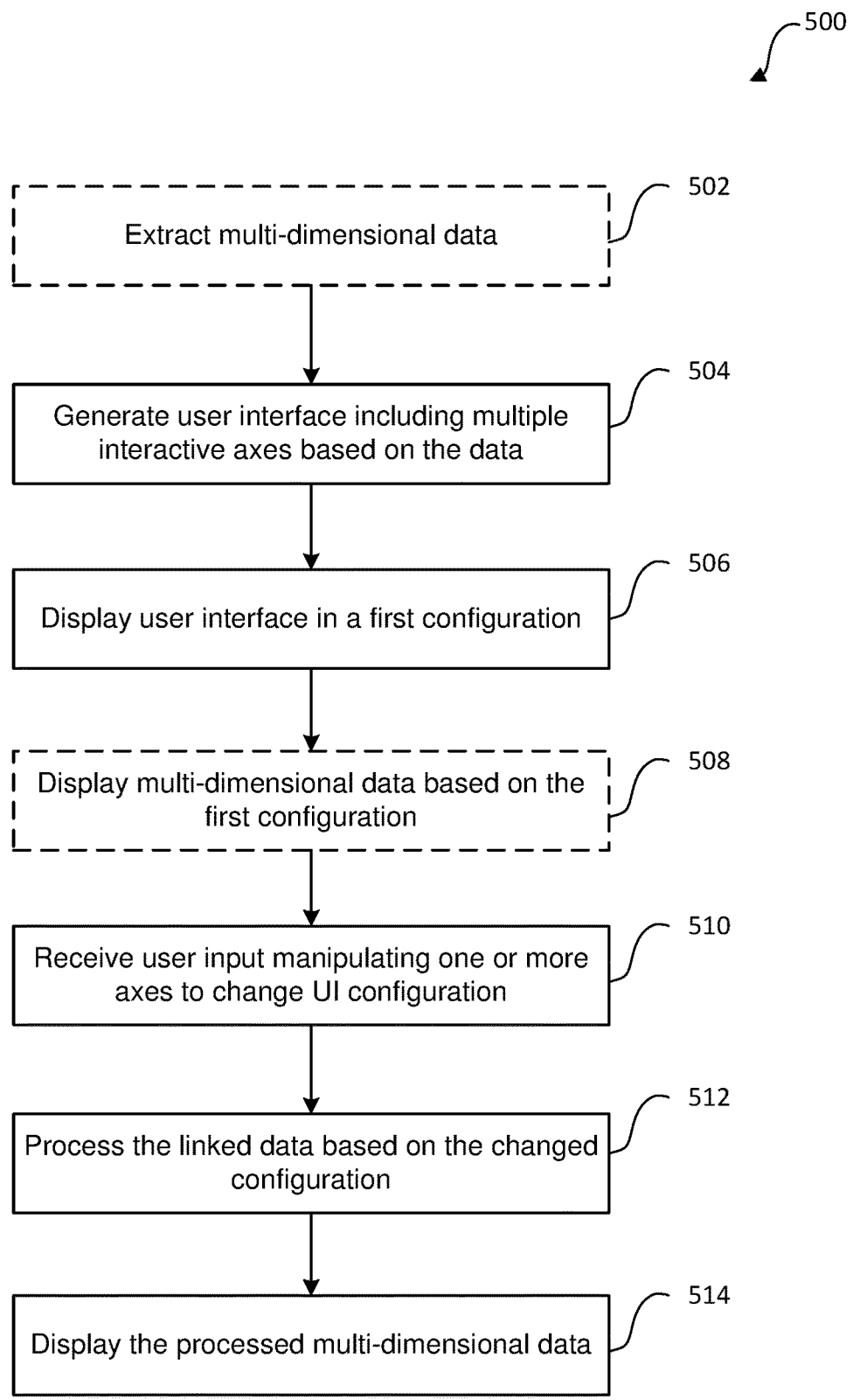
FIG. 5 is a flowchart illustrating an exemplary method for processing multi-dimensional data according to some aspects of the present disclosure.
Figure 6:
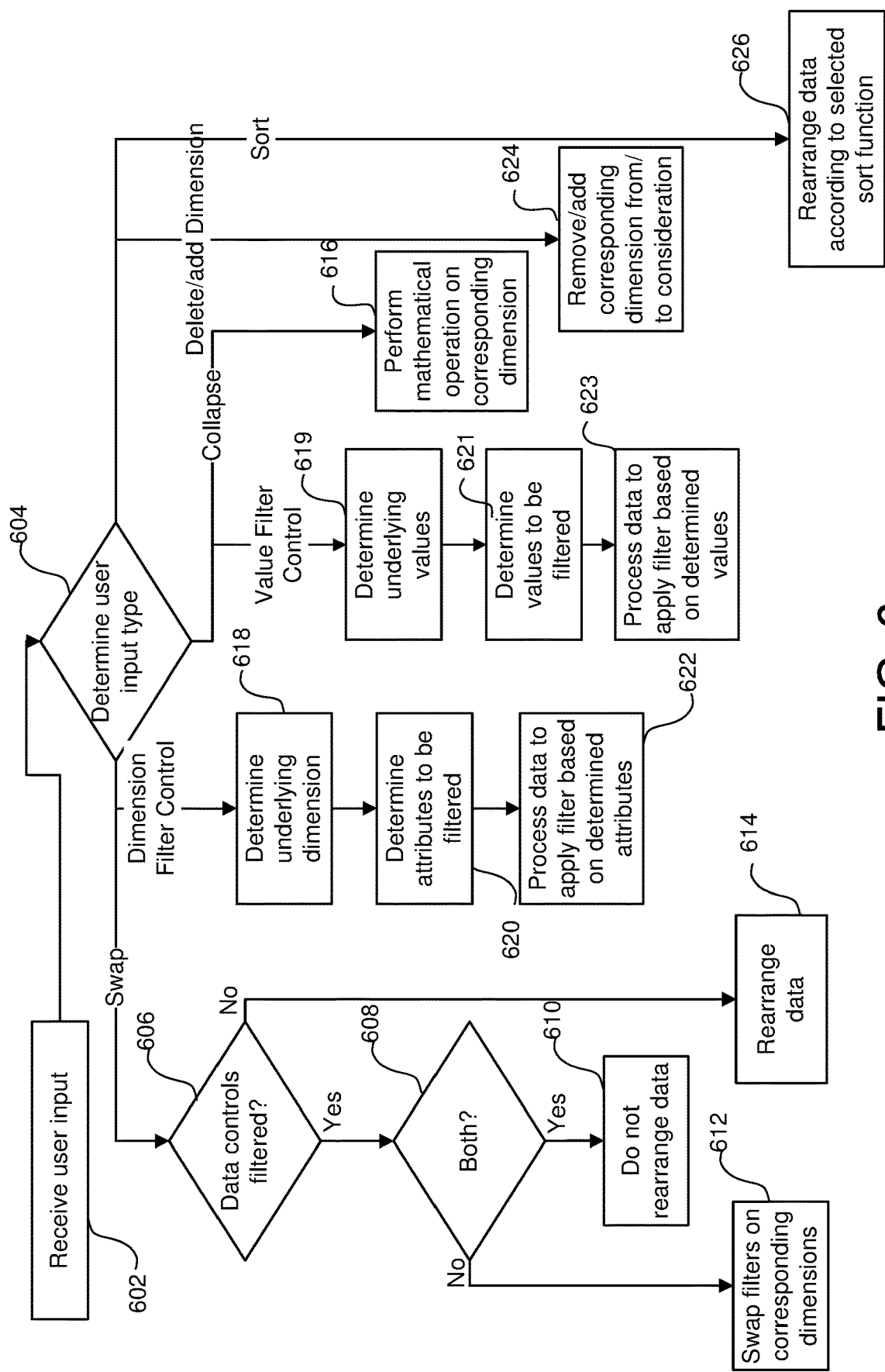
FIG. 6 is a flowchart illustrating an exemplary method for manipulating multi-dimensional data based on user inputs.

FIGS. 5 and 6 illustrate the exemplary methods 500 and 600 as a collection of steps in a logical flowchart, which represents a sequence of operations that can be implemented in hardware, software, or a combination therefore. In the context of software, the steps represent computer instructions that, when executed by one or more processors, perform the recited operations. The order in which the processes are described in not necessarily intended to be construed as a limitation. In certain cases the steps can be performed in a different order to that shown. Further, in certain cases multiple steps can be combined into a single step, a single step can be performed as multiple separate steps, additional steps can be included, and/or described steps can be omitted. For discussion purposes, the methods 500 and 600 are described with reference to FIGS. 1-4.

The method begins at step 502 where one or more multi-dimensional datasets are accessed. In one implementation, the datasets may be accessed by input module 302 from one or more active spreadsheets or files stored in the memory 410. Furthermore, the data processing tool 300 creates a copy of the accessed dataset and subsequently processes the copy of the accessed dataset and not the original to preserve the original data.

Once the dataset is accessed and a copy is created, the dimensions, attributes, and values are detected. As described previously, the dimensions, attributes and values may be detected automatically, semi-automatically or manually.

Next, at step 504, the data object 201 is generated in the user interface 200 based on the identified dimensions and attributes. To that end, the generation module 304 generates dimension controls, such as interactive axes 204, corresponding to each dimension identified in the previous step. Each dimension control is also associated with the attributes corresponding to the dimension they represent.

At step 506, the data object 201 is displayed in the user interface 200 in a default configuration on the display 418. According to one aspect, the default configuration includes dimension controls for each identified dimension. Alternatively, the default configurations may include dimension controls for a predetermined number of identified dimensions. Furthermore, in some aspects, at least one dimension may be filtered by a default attribute, and in other aspects, the dimensions may not be filtered in the default configuration. It will be understood that a developer may program the default configuration of the user interface 200 in any possible format without departing from the scope of the present disclosure.

In some aspects, the method includes step 508, where the output module 308 displays a display object, which depicts the multi-dimensional data rearranged according to the default configuration of the user interface 200. The display object may be a spreadsheet/table 310 and/or a chart 312 in this default configuration. In one implementation, the default display object may be selected by a user when the user first installs or executes the data processing tool. Alternatively, the default display object may be preselected by a developer or administrator.

Once the user interface 200 is displayed, a user may manipulate the data object 201 by adding value filter controls, swapping, collapsing, sorting deleting or adding one or more dimension controls, or by adding dimension filter controls to the dimension controls. These manipulations (described in detail above) cause the configuration of the data object 201 to change from the default configuration to a second configuration. User input that effects the manipulation is transmitted from the user interface 200 to the computing module 306 at step 510.

At step 512, the copy of the underlying multi-dimensional dataset is processed based on a detected manipulation type. FIG. 6 illustrates various processing performed by the computing module 306 in step 512.

At step 514, the computing module 306 forwards the processed data to the output module 308, which renders a display object on the display 418 based on the processed data. A user may select the format of the display object or the system may select a default format. If the user selects a particular format, this user selection is forwarded to the output module 308, which configures the display object based on the selected format. For instance, if the output is requested in a table, the output module 308 may present the processed dataset in rows and columns of a table. If the requested format is/includes a line chart, the output module 308 may present the processed dataset in a line chart in the display object.

Once the processed dataset is displayed, the user may view the data and if satisfied, stop the process. Alternatively, if the user is unsatisfied or requires further views of the multi-dimensional data, the user may further manipulate the data controls in the user interface 200 and repeat process steps 512 and 514. Furthermore, the tool is also configured to allow a user to save, print, or email the display objects or generate a report from the display objects. To that end, the user interface 200 may include a drop-down or pop-up menu (not shown) that allows the user to save, print, send or generate a report from the display objects.

FIG. 6 is a flowchart illustrating an exemplary method for processing multi-dimensional data based on manipulation of data controls in the data object 201. The method begins at step 602, where the computing module receives a user input corresponding to manipulation of one or more data controls in the user interface. At step 604, the computing module 306 determines the type of user input.

If the user input type corresponds to swapping of dimension controls, the method proceeds to step 605, where the method determines whether either of the swapped dimension controls is a foreground dimension control. If neither of the dimension controls is a foreground dimension control, the method stops without processing the underlying dataset. If at least one of the dimension controls is a foreground dimension control, the method proceeds to step 606, where the method determines whether dimension filter controls have been applied to either of the dimension controls being swapped (i.e. by a user adding a filter control to one or both of the dimension controls before performing operations to swap those dimension controls). If any dimension filter controls are identified, the method proceeds to step 608, where the computing module 306 determines whether filter controls have been applied to both the dimension controls. If filter controls have been applied to both the dimension controls, the method proceeds to step 610 where the dimensions are swapped but the filters remain unchanged. Alternatively, if a filter control has only been applied to one dimension control, the method proceeds to step 612, where the computing module 306 removes the dimension filter control before processing the swap. In some embodiments the computing module 306 adds a new dimension filter control in a default position to the dimension control which, prior to the swap, did not have a filter control. The computing module 306 then outputs the data based on the swapped dimension controls and (if done) the newly added filter control. If no filter controls are associated with the dimension controls being swapped, the method proceeds to step 614 where the computing module 306 processes the underlying data so that data in the rows are swapped with data in the columns.

Alternatively, if the received user input corresponds to collapsing of a dimension control, the method proceeds to step 616, where the computing module 306 identifies a mathematical operation based on user input, performs the selected mathematical operation. The mathematical operation may, for example, be an addition, multiplication, averaging, standard deviation, maximum, or minimum operation performed on the dimension corresponding to the collapsed dimension control.

If it is determined that the input corresponds to applying a filter control (i.e. to a dimension control), the method proceeds to step 618, where the computing module 306 identifies the underlying dimension to be filtered based on the dimension control to which the filter control is added. At step 620, the computing module 306 determines the attributes to be filtered. Specifically, the computing module 306 determines the attribute of the underlying dimension that corresponds to the attribute(s) selected in the user interface 200. Once the dimensions and attribute(s) are identified, the computing module processes the underlying dataset to apply a filter based on the identified attribute(s), at 622.

If it is determined that the input corresponds to applying a value filter control (i.e. to a value or range of values), the method proceeds to step 619, where the computing module 306 identifies the underlying values to be filtered based on the values selected by the value filter control. At step 621, the computing module 306 determines the values to be filtered. Specifically, the computing module 306 determines the values of the underlying dataset that corresponds to the value(s) or value range selected in the user interface 200.

Once the values are identified, the computing module processes the underlying dataset to apply a filter based on the identified value(s), at 623.

If the input corresponds to the addition or deletion of a dimension control, the computing module 306 adds or removes the dimension selected by the user to or from consideration in the underlying data at step 624. It will be appreciated that for this to happen, the data represented by the dimension control already exists in the underlying dataset. For example, the dataset may include information on 'customer sex', which has not yet been selected as significant by the user. If the user later considers that customer sex may be a significant explanatory variable of the data being analysed, the relevant database field can then be tagged as a dimension and it can be added as an additional background dimension (i.e., in the back, left, or down position in the FIG. 2A) which can later be rotated into the foreground (i.e., up, right or forward position in FIG. 2A) as desired.

If the input corresponds to sorting of attributes of a particular dimension, the method proceeds to step 626 where the computing module 306 determines the sorting to be applied based on user input. For example, the computing module 306 determines whether alphabetical, numerical or custom sorting is selected. Subsequently, the computing module 306 processes the dataset to rearrange the underlying data according to the selected sorting function.

It will be appreciated that aspects of the present disclosure are directed to data objects and to the link between their manipulation and an operation to be performed on underlying data. The actual processing of the underlying data, once the operation is identified, is done using standard spreadsheet and/or OLAP processing.

EXAMPLES

FIGS. 7A-7F illustrate particular examples of a data object, example operations a user can perform using the data object, and the processed datasets that result from those example operations. The data object in these examples includes three dimension controls in the form of interactive axes 702, 704 and 706, each corresponding to a dimension of the underlying example dataset 100 of Table 1. Interactive axis 702 corresponds to the time dimension, interactive axis 704 corresponds to the product dimension, and interactive axis 706 corresponds to the location dimension of the dataset 100. Further, the attributes of each dimension are positioned along the length of the corresponding axis. For instance, the stores in Boston, Los Angeles, New York, and Chicago are position along axis 706, the time quarters Q1, Q2, Q3, and Q4 are positioned along the time axis 702, and the product attributes home entertainment sets, appliances, phones, and televisions are positioned along the product axis 704. Any of the interactive axes can be filtered. If the user wishes to view two-dimensional data, the user may apply a filter to one axis. Alternatively, if the user wishes to view one-dimensional data, the user may apply filters to two axes, and finally, if the user wishes to view a single data value, the user may filter all three dimensions simultaneously.

In the examples depicted in FIGS. 7B-7G only one dimension is filtered at a time, such that two-dimensional data is displayed corresponding to the right and down dimension controls. The third active dimension control (the up dimension control) is displayed as a series of data slices, which a user can page through.

Moreover, the display object in these examples is a table 310, but it can also be a chart 312.

Figure 7A:
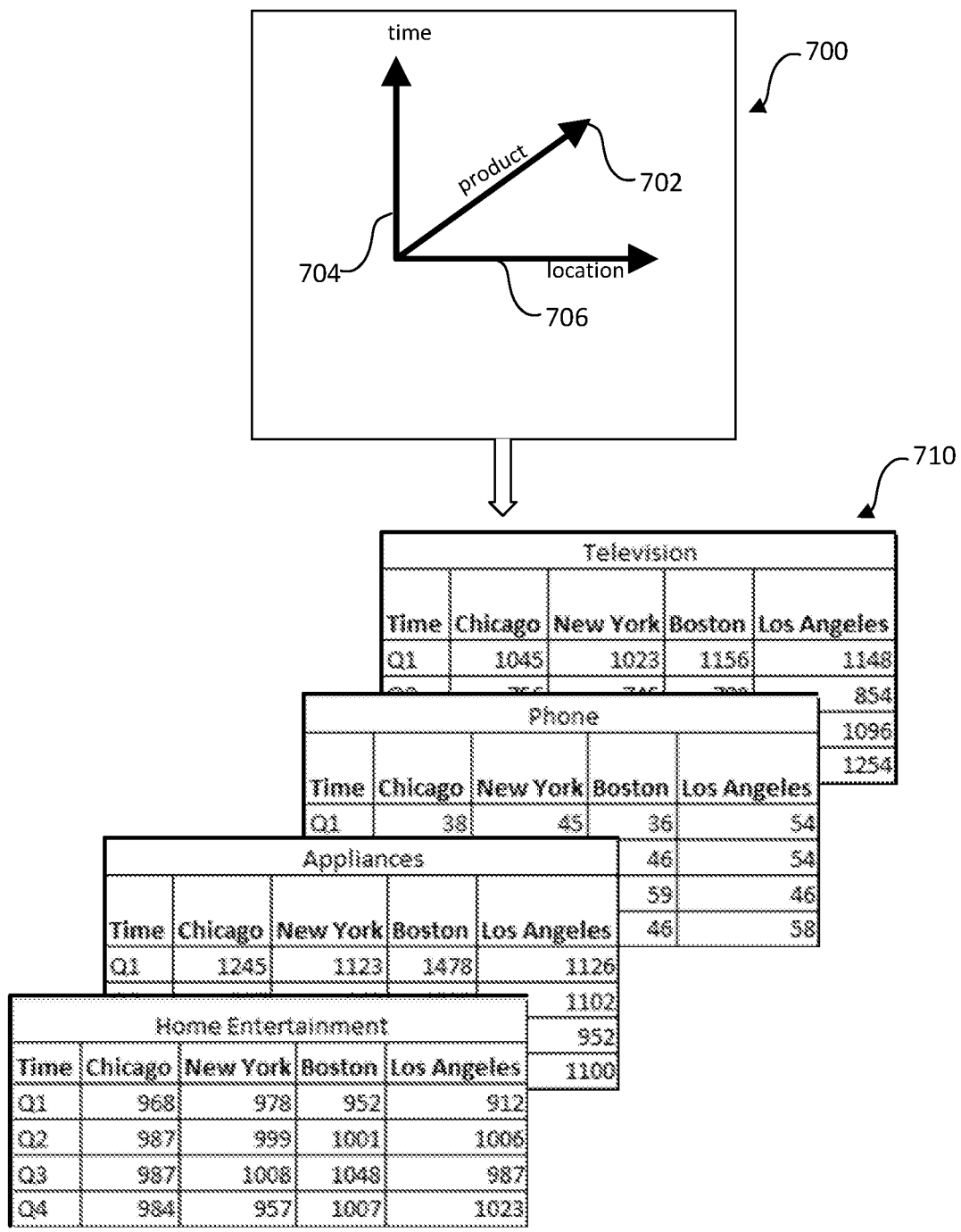
FIG. 7A illustrates a data object in a default configuration and corresponding display object in the default configuration.

FIG. 7A illustrates the data object 700 in a default configuration along with table display objects 710. In this configuration, all the interface axes 702-706 are foreground axes and therefore the display object 710 displays all three dimensions of the underlying data, albeit, in four independent tables. In the example, each table is the subject of an attribute of the product dimension (Television, Phone, Appliances, and Home Entertainment), the location dimension is represented in the columns of the tables, and the time axis is depicted in the rows of the tables.

Figure 7B:
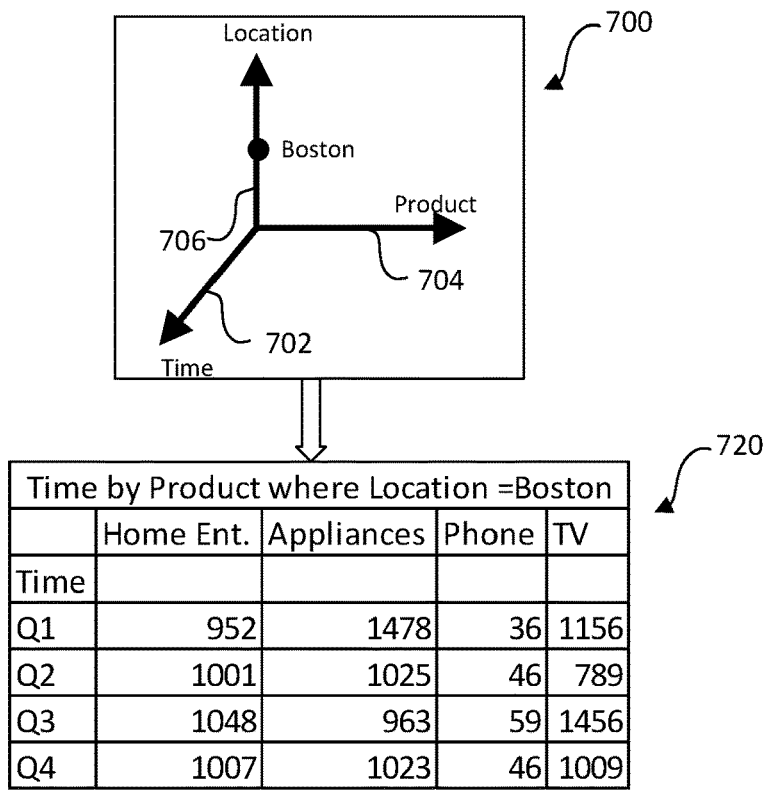
FIG. 7B illustrates the data object of FIG. 7A and the corresponding display object after two interactive axes are swapped.

FIG. 7B illustrates a data object 700 in which the top, right, and back axes are foreground axes and a dimension filter control is applied to the location axis 706. In this case, the columns of the table display the product axis and the rows of the table display the time axis. In this instance, the user has applied a dimension filter control in respect of a single attribute: the 'Boston' attribute. Accordingly, the computer module 306 processes the underlying dataset 100 to generate display object 720 which reveals the total number of units sold by the Boston store in each quarter in each product category.

Figure 7C:
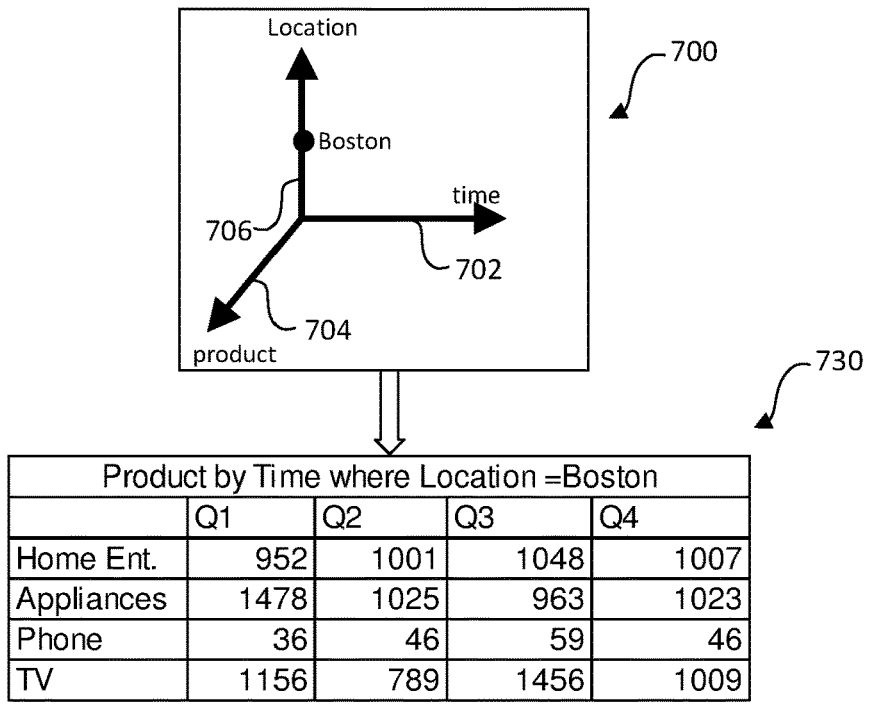
FIG. 7C illustrates the data object of FIG. 7B and the corresponding display object after two interactive axes are swapped.

FIG. 7C illustrates the data object 700 and the corresponding display object in a second configuration after the product and time axes 704, 702 as shown in FIG. 7B are swapped. Because neither the product nor the time axes have associated dimension filter controls, the computing module 306 processes the underlying data to arrange the attributes of the time dimension in columns c1-c4 and arrange the attributes of the product dimension in rows r3-r6. Because of this processing, the display object 730 reveals the total revenue for products in Boston in each quarter.

Figure 7D:
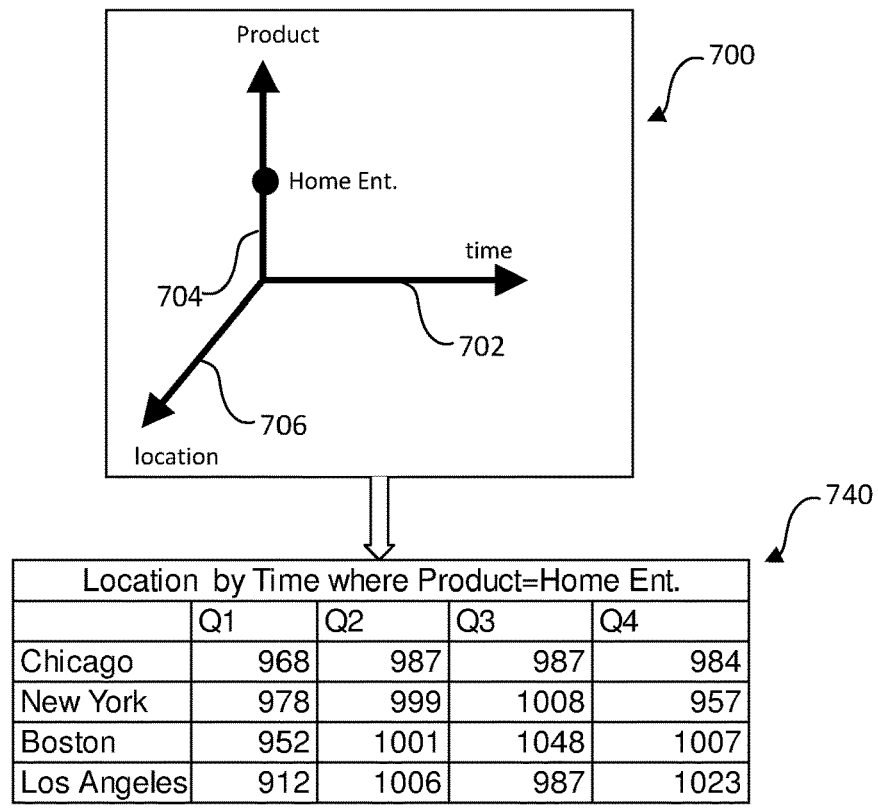
FIG. 7D illustrates the data object of FIG. 7C and the corresponding display object after an interactive axis is filtered to a range of attributes.

FIG. 7D illustrates the data object 700 depicted in FIG. 7C and the display object 740 after the product and location axes 704 and 706 are swapped. In this case, an axis without a dimension filter control (the location axis) is swapped with an axis that has a dimension filter control (the product axis). Accordingly, after the swap, a filter control is applied to the product axis 704, whereas the filter control is removed from the location axis 706. In FIG. 7D the filter control for the product dimension is associated with the 'Home Entertainment sets' attribute. Accordingly, the display object 740 now reveals the total units of home entertainment sets sold per store per quarter. Similarly, if a user subsequently swaps the time and product axes 702 and 704 and applies a filter control in respect of the "Q3" attribute to the time axis, the display object would reveal the total units sold in each product category by each store in the third quarter.

Figure 7E:
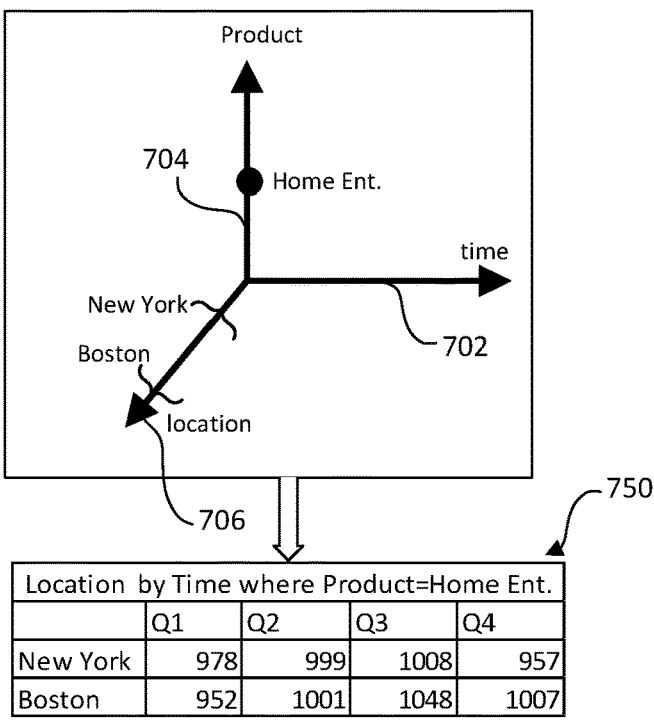
FIG. 7E illustrates the data object of FIG. 7D and the corresponding display object after two interactive axes are filtered to a range of attributes.

FIG. 7E illustrates the data object 700 and the display object 750 with dimension filter controls applied to both the product axis 704 and the location axis 706. The dimension filter control applied to the product axis is associated with a single attribute—the "Home Ent" attribute. The dimension filter control applied to the location axis is associated with a range of attributes including "New York" and "Boston." In this case, the computing module 306 processes the underlying dataset to reveal results only for home entertainment sets sold in New York and Boston in all four quarters (see display object 750).

Figure 7F:
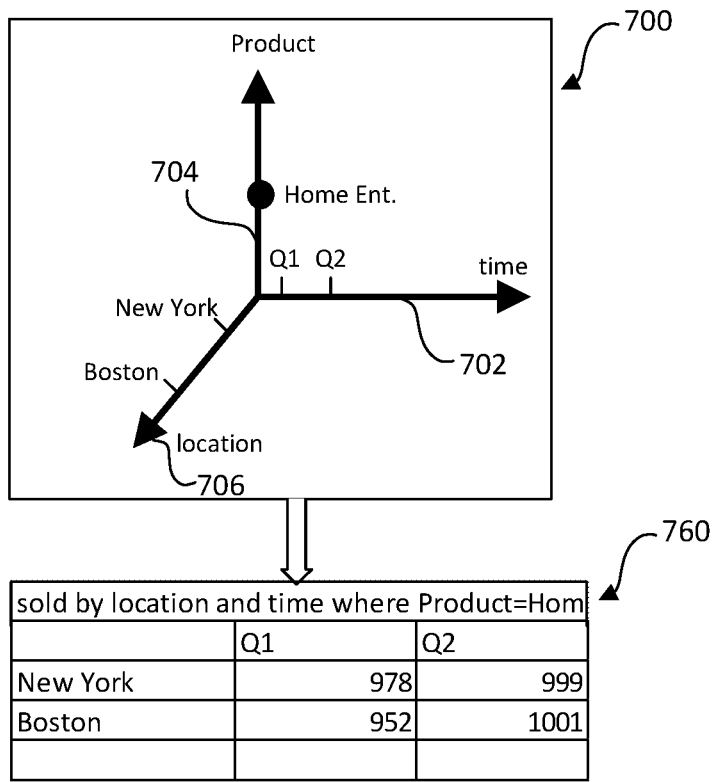
FIG. 7F illustrates the data object of FIG. 7C and the corresponding display object after an interactive axis is deleted.
Figure 7G:
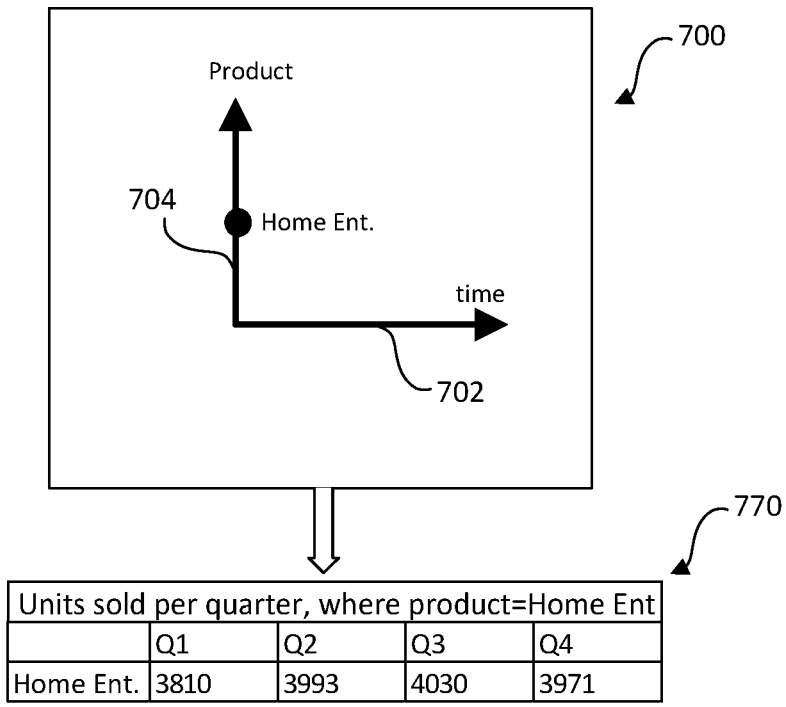
FIG. 7G illustrates the data object of FIG. 7C and the corresponding display object after an interactive axis is collapsed.

FIG. 7F shows the display object shown in FIG. 7G following further operations to cause only the total units of home entertainment sets sold in New York and Boston in the first half of the year to be revealed. This is achieved by adding a dimension filter control associated with the range "Q1" to "Q2" to the time axis 602.

FIG. 7G illustrates the data object of FIG. 7B and the display object 770 after the location axis is deleted. In this case, the computing module 306 deletes the location dimension to generate a one-dimensional data object revealing total units of home entertainment sets sold in each quarter. If the product axis were to be deleted, the product dimension would be deleted from the underlying data and the display object 770 would reveal the total number of products sold per quarter per location to disclose which store is performing the best.

FIG. 7H illustrates the data object of FIG. 7D with the product axis 704 collapsed to perform the 'maximum' mathematical operation. Accordingly, the computing module 306 determines the value of the highest number of units of a product sold by each store in each quarter. If a 'summation' operation were selected instead, the computing module 306 would determine the sum of the number of units sold for each attribute to determine the total number of products sold by each store in each quarter.

In the present disclosure, a data object includes dimension controls that are depicted as interactive axes radially extending from a central point. However, it will be appreciated that this is one particular embodiment of the data object. In other embodiments, the data object may include dimension controls that are depicted as vertically parallel interactive axes (see FIG. 8A). Alternatively, the data object may include dimension controls that are depicted as horizontally parallel interactive axes (see FIG. 8B).

By providing a data object with interactive data controls as described, the data processing tool 300 of the present disclosure provides a platform for users to easily manipulate and process multi-dimensional data. The tool 300 is also highly intuitive to use as it allows a user to manipulate data controls in a manner similar to the required manipulation of the underlying data. For example, to rearrange the underlying data, the user can rearrange the dimension controls, and to obtain total values for a dimension, the user can collapse the corresponding data control. Similarly, to filter the underlying data according to values, a user can apply value filter controls, and to filter the underlying data according to a particular attribute or range of attributes, the user can apply dimension filter controls directly to the relevant dimension controls.

Combining Data Objects

FIGS. 9A and 9B illustrate spreadsheets 900 and 910 that illustrate a three-dimensional and a two-dimensional dataset respectively. Spreadsheet 900 includes three two-dimensional debt tables showing private, household, and corporate debt by country and year, whereas spreadsheet 910 includes one two-dimensional table showing GDP by country and year. To derive debt-to-GDP ratios from the spreadsheets 900 and 910, a user typically performs the following steps: (1) produces a combined spreadsheet 930 showing both debt and GDP data as shown in FIG. 9C; (2) writes a cell formula (in cell 2046H in FIG. 9C) to divide the first data cell for debt (here, cell 2046B) by the matching data cell for GDP (here cell 2046E); and (3) replicates this formula across the other countries (here, the UK and Australia).

At the end of the process, the aggregate debt to GDP ratios are displayed in the same spreadsheet as shown in FIG. 9C (see item 935). This example shows the aggregate debt ratios in the private sector. If a user wishes to calculate the aggregate debt ratios for household and corporate sectors as well, the user repeats this process.

Figure 9D:
FIG. 9D illustrates a spreadsheet in which new data and new formulas can be entered.

Furthermore, in known techniques it is necessary to amend the data sheet every time new data is provided, since formulas are cell specific. FIG. 9D illustrates a spreadsheet 940, in which new data and new formulas can be entered in rows 2713 et seq. The data may be linked to an external database and automatically populated. However, the user has to replicate the formulas for these new cells. Moreover, errors may often occur in cell formulas, which can be very hard to locate and/or correct.

To overcome at least one or more of these issues, aspects of the present disclosure allow users to import multiple data objects 201 in a user interface, such as user interface 200, where each data object represents an underlying dataset. The tool 300 allows users to combine the displayed data objects using mathematical operations, thereby performing operations on the underlying datasets. When compared with the process of using formulas described above, the presently disclosed systems and methods provide a simpler way of performing mathematical operations on two or more datasets. Specifically, the tool 300 allows a user to manipulate the displayed data objects to perform functions such as addition, subtraction, multiplication, or division on the underlying datasets.

Any data objects that include at least one common dimension can be combined in a meaningful way according to aspects of the present disclosure. For example, a three-dimensional data object representing the dataset of FIG. 9A can be combined with a two-dimensional data object representing the dataset of FIG. 9B.

Continuing with the debt to GDP ratio example, a method and user interface for combining data objects is described.

FIG. 10 illustrates a user interface, such as user interface 200, which displays two data objects—a debt object 1002 and a GDP object 1004. The debt object 1002 and the GDP object 1004 represent the underlying datasets shown in FIGS. 9A and 9B. The debt object 1002 includes three dimension controls, each for a corresponding dimension of the underlying dataset: Year (1834 to today), Country (USA, UK, and Australia), and Type (Private, Household and Corporate). The GDP object 1004 includes two dimension controls, each for a corresponding dimension of the underlying dataset: Year (1790 to today) and Country (USA, UK, and Australia).

The datasets 900 and 910 may be accessed by input module 302 from one or more active spreadsheets or files stored in the memory 410. Furthermore, the data processing tool 300 may create a copy of the accessed datasets and subsequently process the copies of the accessed datasets and not the originals to preserve the original data.

A mathematical operation, such as addition, subtraction, multiplication, division, etc., may be selected between the two datasets. In one aspect, the mathematical operation may be selected by right-clicking in the user interface to display a drop-down menu and selecting an operation from the menu. Alternatively, the user interface may include a drop-down menu 1006 for mathematical operation as depicted in FIG. 10A.

If the division operation is selected between the two data objects 1002 and 1004, a combination data object 1006 is displayed (as shown in FIG. 10B) that represents the outcome of the division operation, i.e., debt ratio for each country by year and type of debt. The corresponding display tool (not shown) then displays a chart showing the actual debt ratio for each country by year and type of debt. In the illustrated embodiment, the resultant data object 1006 replaces the input data objects 1002 and 1004 in the user interface 200. However, it will be appreciated that in other embodiments, the resultant data object 1006 may be displayed in the user interface 200 along with the input data objects 1002 and 1004.

It will be understood that any other operations, such as filtering, slicing, dicing, adding, removing, collapsing, etc., can be performed on the input or output data objects when they are being combined.

Figures 11A, 11B:
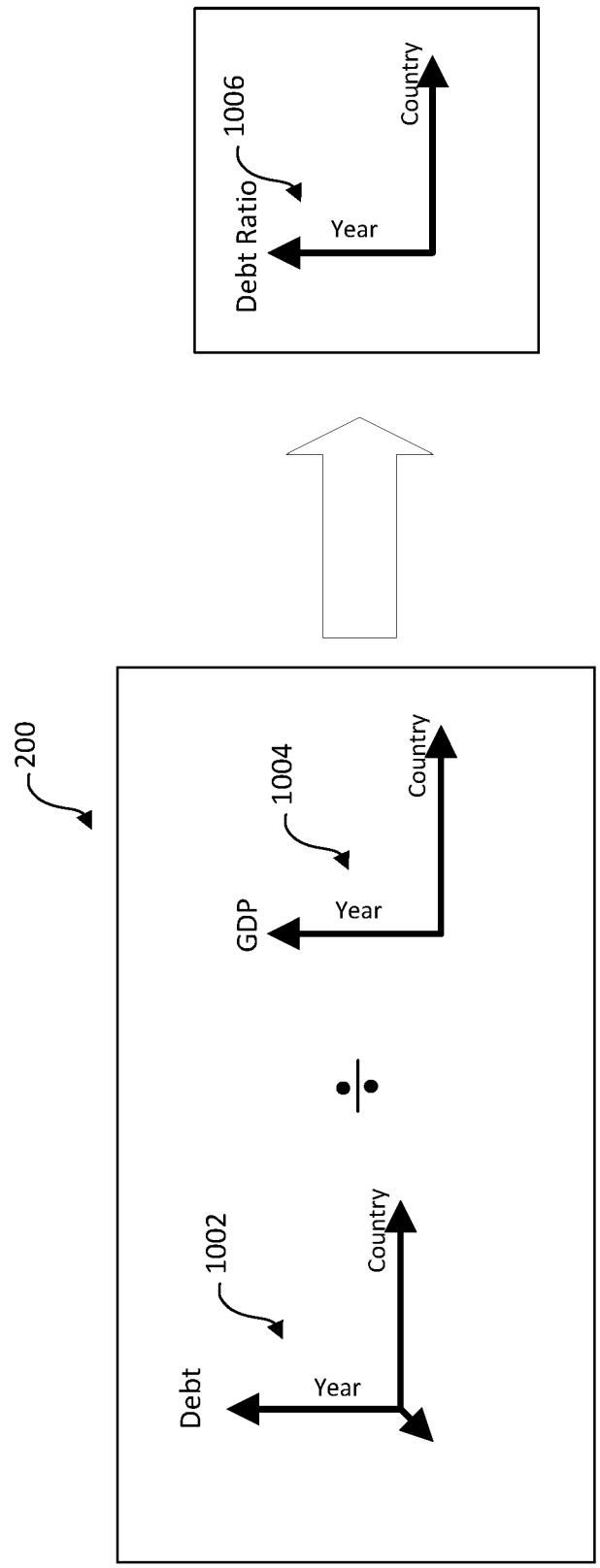
FIG. 11A illustrates a user interface with two data objects according to an aspect of the present disclosure.
FIG. 11B illustrates the user interface after a mathematical operation is performed on the two data objects of FIG. 11A.

For example, to obtain the aggregate debt to GDP ratio data, the "Type" interactive axis is collapsed as shown in FIG. 11A. The resulting calculation produces a two-dimensional data object 1110 as shown in FIG. 11B that displays the ratio of aggregate debt by country by year. Alternatively, the same result may be obtained by collapsing the 'Type' axis in the output data object 1006 after the debt and GDP data objects are combined.

Figures 12A, 12B:
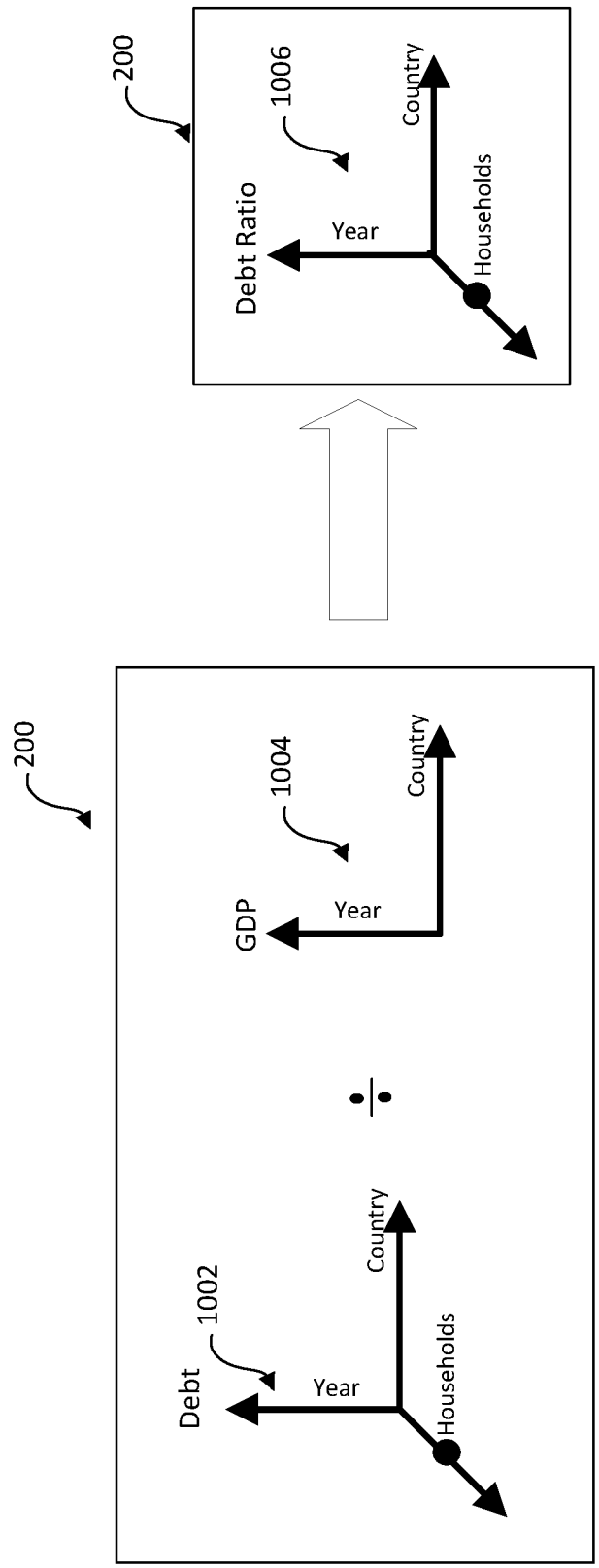
FIG. 12A illustrates a user interface with two data objects according to an aspect of the present disclosure.
FIG. 12B illustrates the user interface after a mathematical operation is performed on the two data objects of FIG. 12A.

Similarly, to obtain the aggregate debt to GDP ratio data for households, the 'Type' interactive axis is filtered to the type 'households'. This displays the aggregate debt ratio for households by year and country as shown in FIGS. 12A and 12B. It will be appreciated that the same results may be obtained by filtering the 'Type' axis of the data object 1006 to 'households' after the debt and GDP data objects are combined.

Figure 13:
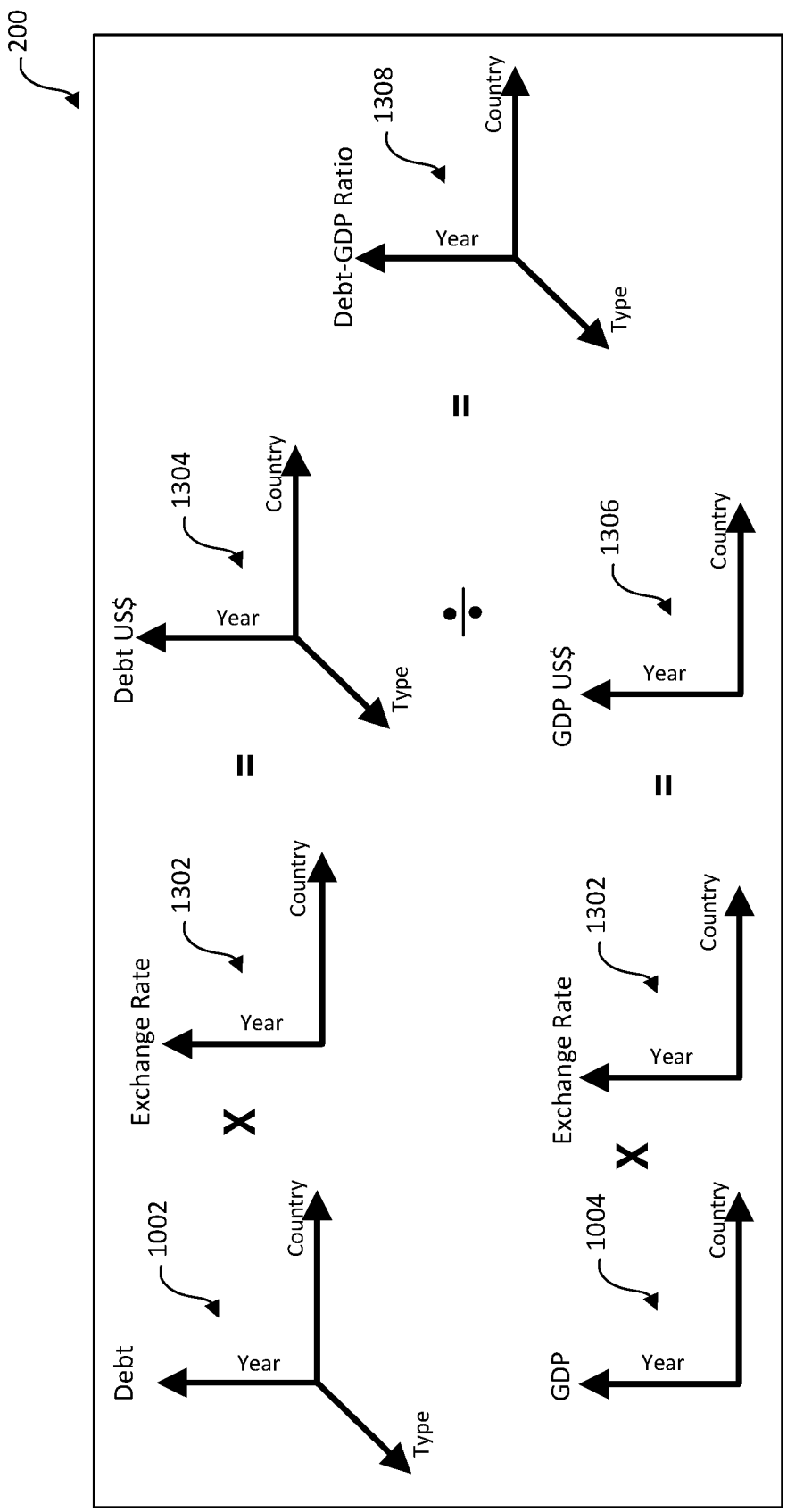
FIG. 13 illustrates a user interface showing mathematical operations being performed on multiple data objects according to one aspect of the present disclosure.

Furthermore, as described previously, any mathematical formula can be performed between data objects, and the dimensions of the data objects ensure that the formulas are correctly aligned. For example, both the Debt and the GDP data objects can be multiplied by an Exchange Rate data object that converts all data from national currencies to (for example) US dollars. FIG. 13 illustrates this example, where the debt object 1004 is multiplied with an exchange rate data object 1302 (including year and country dimensions). The resultant data object 1304 shows the Debt in US dollars for all years, countries, and types of debt. Similarly, the GDP object 1004 is multiplied with the exchange rate object 1302 to obtain a data object 1306 that shows the GDP in US dollars for all years and countries. The tool allows a user to perform cascaded operations, by allowing a user to select the resultant data objects 1304 and 1306 and perform mathematical operations on these data objects to further manipulate the underlying data. For instance, in FIG. 13, the data object 1304 is divided by the data object 1306 to obtain the debt to GDP ratio object 1308.

Figure 14:
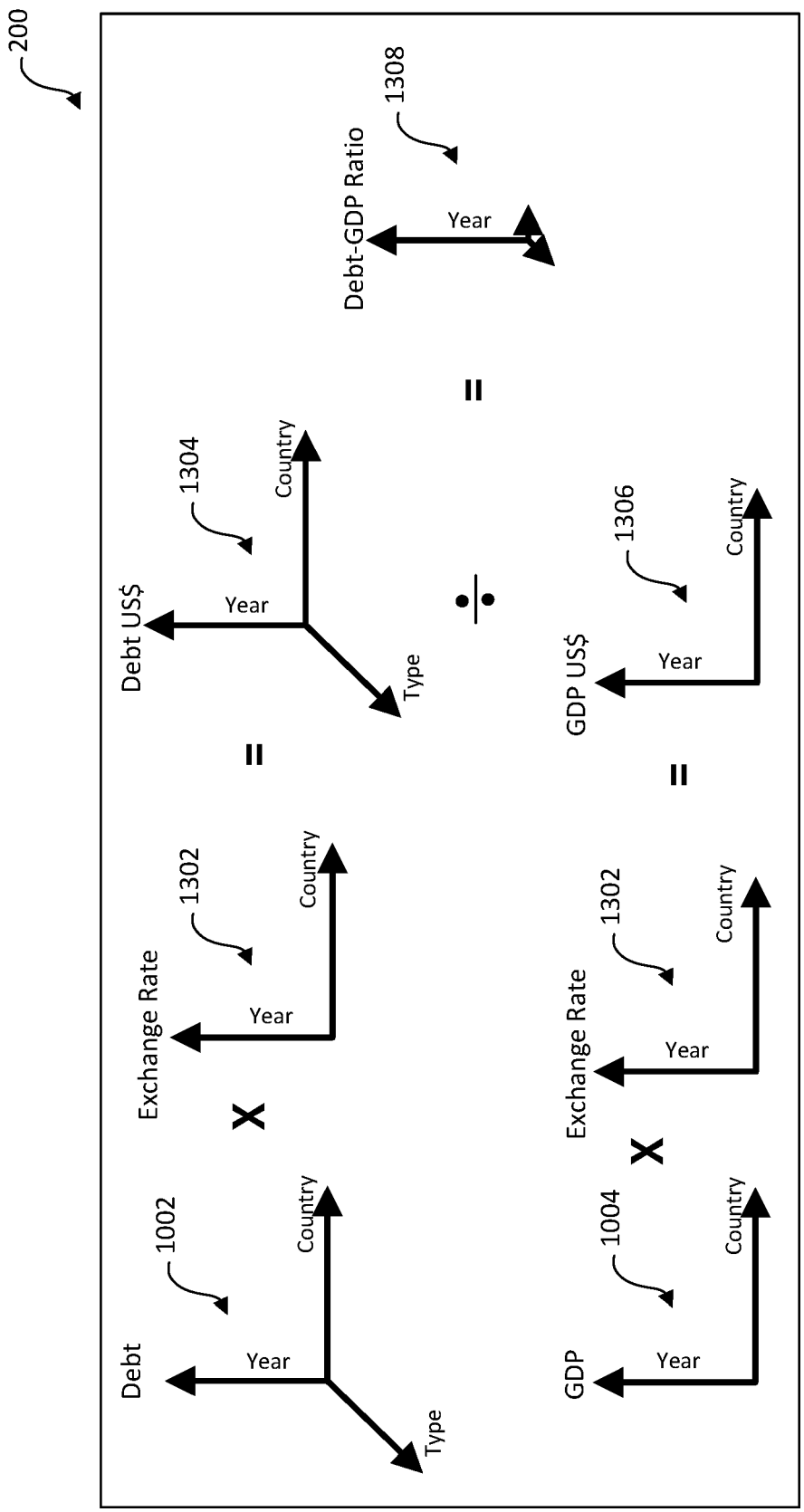
FIG. 14 illustrates a user interface showing mathematical operations being performed on multiple data objects according to one aspect of the present disclosure.

The dimension controls of the data object 1308 can be further filtered, collapsed, added, deleted, sliced, or diced without departing from the scope of the present disclosure. For example, the country and type dimensions may be collapsed so that the data object 1308 reveals aggregate global debt over time as shown in FIG. 14.

It will be appreciated that more data objects may be added to the user interface 200 at any time to perform further mathematical operations. Alternatively, one or more data objects may be removed from the user interface.

Similarly, an accountant could use this tool to determine profit results across a company with one formula. Subtract Costs (dimensioned by Store, Product and Month) from Revenue (also dimensioned by Store, Product and Month) to derive Profit (dimensioned the same way).

By combining data objects to apply a formula as described above, a single formula can be applied to multidimensional data, rather than applying multiple replicated formulas on a cell-by-cell basis as in spreadsheets today. Mathematical operations are therefore performed in a transparent and consistent way, unlike the situation with spreadsheets, which are, abound with errors through poor replication of formulas, failing to expand replicated formulas as new data is added, and similar problems with using replicated cell formulas.

Figure 15:
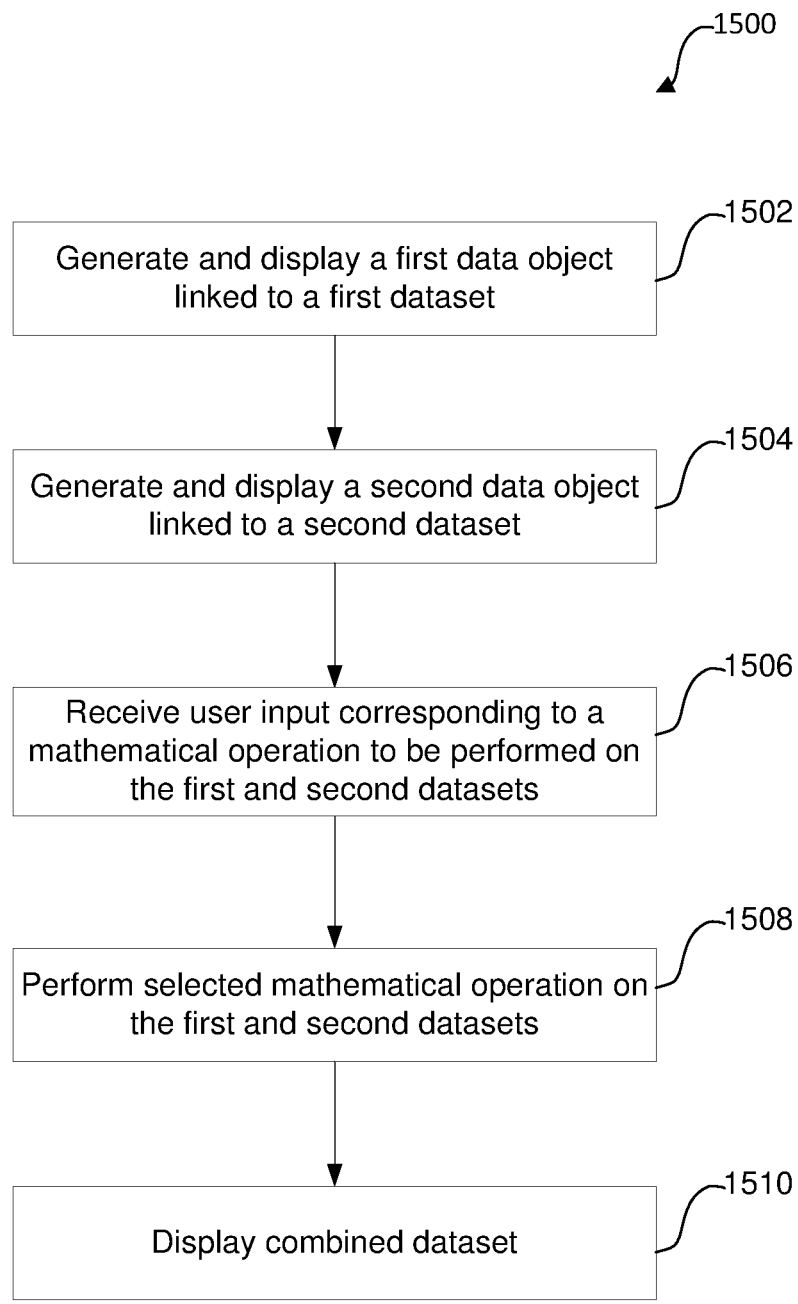
FIG. 15 is a flowchart illustrating an exemplary method for performing a mathematical operation on multiple datasets according to some aspects of the present disclosure.

FIG. 15 illustrates an exemplary method 1500 for performing a mathematical operation on multiple data sets (such as a first dataset and a second dataset). The method begins at step 1502, where a first data object linked to the first dataset is generated and displayed. The first data object may be similar to the data object described with reference to FIGS. 2-8 and can be generated in a similar manner. For example, the first dataset can include a plurality of first data object dimension controls, where each first data object dimension control corresponds to a dimension of the first dataset, and where each first data object dimension control is manipulable by a user to modify the first dataset.

At step 1504, a second data object linked to the second dataset is generated and displayed. As with the first data object, the second data object includes a plurality of second data object dimension controls. Each second data object dimension control corresponds to a dimension of the second dataset, and each second data object dimension control is manipulable by a user to modify the second dataset.

It will be appreciated that a given data object dimension control is manipulable by a user to swap a position of the given dimension control with another dimension control; select a particular attribute of the dimension to which the given dimension control corresponds; select a particular range of attributes of the dimension to which the given dimension control corresponds; select a range of values of the dimension to which the given dimension control corresponds; collapse the given dimension control to perform a mathematical operation on the dimension to which the given dimension control corresponds; or delete the given dimension control.

At step 1506, a user input is received. The user input corresponds to selection of one or more mathematical operations to be performed on the first and second datasets. As noted previously, the mathematical operation may be any suitable operation such as addition, multiplication, subtraction, division, percentage, square root, etc. the mathematical operation may be selected via any of the techniques described with respect to the data objects previously. For example, a mathematical operation may be selected via a drop-down menu, a pop-up menu, and so on.

At step 1508, the selected mathematical operation is performed on the first and second datasets to generate a combined dataset. Performing the mathematical operation on the first and second datasets to generate the combined dataset includes performing the mathematical operation on a specific dimension of the first dataset and a specific dimension of the second dataset. The specific dimension of the first dataset may be the dimension of the first dataset that corresponds to a first data object dimension control that is positioned in a defined position in the first data object (e.g., in a front, right or up position). Similarly, the specific dimension of the second dataset may be the dimension of the second dataset that corresponds to a second data object dimension control that is positioned in a defined position in the second data object (e.g., in a front, right or up position).

Finally, at step 1510, the combined dataset is displayed in a display object.

Aspects of the present disclosure are directed to data objects and user interface elements, which allow users to specify various operations to be performed on multidimensional data (e.g. slicing, dicing, drilling up/down, sorting etc.). Once specified, these operations are performed using known spreadsheet and/or OLAP processing techniques.

In the foregoing specification, embodiments of the present disclosure have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

It will be understood that the embodiments disclosed and defined in this specification extend to all alternative combinations of two or more of the individual features mentioned or evident from the text or drawings. All of these different combinations constitute various alternative aspects of the embodiments.

The invention claimed is:

1. A method comprising:
obtaining, by a computing device, a multi-dimensional dataset;
generating, by the computing device, a first arrangement of a graph, wherein the graph represents dimensions of the multi-dimensional dataset with respective interactive axes extending radially from a central point of the graph;
displaying, on a screen of the computing device, a graphical user interface including the first arrangement of the graph and the multi-dimensional dataset;
receiving, by way of the graphical user interface, one or more modifications to the interactive axes, wherein the one or more modifications involve rotating a first axis of the interactive axes from a first orientation around the central point such that the first axis is within a predetermined vicinity of or superimposed on a second axis of the interactive axes, wherein the second axis is at a second orientation with respect to the central point;
generating, by the computing device, a second arrangement of the graph and an updated version of the multi-dimensional dataset in accordance with the one or more modifications, wherein the first axis and the second axis are swapped so that the first axis is in the second orientation and the second axis is in the first orientation in the second arrangement of the graph, and wherein dimensions represented by the first axis and the second axis are re-arranged in the updated version of the multi-dimensional dataset; and
displaying, on the screen of the computing device, the graphical user interface including the second arrangement of the graph and the updated version of the multi-dimensional dataset.

2. The method of claim 1, wherein displaying the multi-dimensional dataset comprises:
displaying, as columns of a chart or table, data in a first dimension of the multi-dimensional dataset that is represented by the first axis; and
displaying, as rows of the chart or table, data in a second dimension of the multi-dimensional dataset that is represented by the second axis.

3. The method of claim 2, wherein displaying the updated version of the multi-dimensional dataset comprises:
displaying, as rows of the chart or table, the data in the first dimension of the multi-dimensional dataset; and
displaying, as columns of the chart or table, the data in the second dimension of the multi-dimensional dataset.

4. The method of claim 1, wherein each of the interactive axes is either a foreground dimensional control or a background dimensional control, wherein displaying the multidimensional dataset comprises displaying only dimensions of the multi-dimensional dataset represented by the interactive axes that are foreground dimensional controls, and wherein displaying the updated version of the multi-dimensional dataset comprises displaying only dimensions of the multi-dimensional dataset represented by the interactive axes that are foreground dimensional controls.

5. The method of claim 4, wherein the interactive axes that are foreground dimensional controls extend in a substantially up direction, right direction or forward direction, and wherein the interactive axes that are background dimensional controls extend in a substantially down direction, left direction, or back direction.

6. The method of claim 4, wherein at least one of the first axis and the second axis are foreground dimensional controls.

7. The method of claim 1, wherein the one or more modifications also involve:
receiving, by way of the graphical user interface, specification of a filter to apply to a particular axis of the interactive axes, wherein the filter is associated with one or more attributes of a particular dimension of the multi-dimensional dataset represented by the particular axis; and
filtering the particular dimension of the multi-dimensional dataset by the one or more attributes.

8. The method of claim 7, wherein displaying the second arrangement of the graph comprises displaying the graph with the filter applied to the particular axis, and wherein displaying the updated version of the multi-dimensional dataset comprises displaying the multi-dimensional dataset with the filter applied to the particular dimension.

9. The method of claim 1, wherein the one or more modifications also involve:
receiving, by way of the graphical user interface, an instruction to collapse a particular axis of the interactive axes;
determining that the instruction is associated with a mathematical operation; and
applying the mathematical operation to a particular dimension of the multi-dimensional dataset represented by the particular axis.

10. The method of claim 9, wherein displaying the second arrangement of the graph comprises displaying the graph with the particular axis collapsed, and wherein displaying the updated version of the multi-dimensional dataset comprises displaying the multi-dimensional dataset with the mathematical operation applied to the particular dimension.

11. The method of claim 1, wherein the one or more modifications also involve:
receiving, by way of the graphical user interface, an instruction to delete a particular axis of the interactive axes; and
deleting a particular dimension of the multi-dimensional dataset represented by the particular axis.

12. The method of claim 11, wherein displaying the second arrangement of the graph comprises displaying the graph without the particular axis, and wherein displaying the updated version of the multi-dimensional dataset comprises displaying the multi-dimensional dataset without the particular dimension.

13. The method of claim 1, wherein the one or more modifications also involve:
receiving, by way of the graphical user interface, an instruction to add a new axis to the interactive axes; and
receiving, by way of the graphical user interface, data for a new dimension of the multi-dimensional dataset that is represented by the new axis.

14. The method of claim 13, wherein displaying the second arrangement of the graph comprises displaying the graph with the new axis, and wherein displaying the updated version of the multi-dimensional dataset comprises displaying the multi-dimensional dataset with the new dimension.

15. A non-transitory computer-readable medium containing program instructions that, when executing by a processor, cause a computing device to perform operations comprising:
obtaining a multi-dimensional dataset;
generating a first arrangement of a graph, wherein the graph represents dimensions of the multi-dimensional dataset with respective interactive axes extending radially from a central point of the graph;
displaying, on a screen of the computing device, a graphical user interface including the first arrangement of the graph and the multi-dimensional dataset;
receiving, by way of the graphical user interface, one or more modifications to the interactive axes, wherein the one or more modifications involve rotating a first axis of the interactive axes from a first orientation around the central point such that the first axis is within a predetermined vicinity of or superimposed on a second axis of the interactive axes, wherein the second axis is at a second orientation with respect to the central point;
generating a second arrangement of the graph and an updated version of the multi-dimensional dataset in accordance with the one or more modifications, wherein the first axis and the second axis are swapped so that the first axis is in the second orientation and the second axis is in the first orientation in the second arrangement of the graph, and wherein dimensions represented by the first axis and the second axis are re-arranged in the updated version of the multi-dimensional dataset; and
displaying, on the screen, the graphical user interface including the second arrangement of the graph and the updated version of the multi-dimensional dataset.

16. The non-transitory computer-readable medium of claim 15, wherein displaying the multi-dimensional dataset comprises:
displaying, as columns of a chart or table, data in a first dimension of the multi-dimensional dataset that is represented by the first axis; and
displaying, as rows of the chart or table, data in a second dimension of the multi-dimensional dataset that is represented by the second axis.

17. The non-transitory computer-readable medium of claim 16, wherein displaying the updated version of the multi-dimensional dataset comprises:
displaying, as rows of the chart or table, the data in the first dimension of the multi-dimensional dataset; and
displaying, as columns of the chart or table, the data in the second dimension of the multi-dimensional dataset.

18. The non-transitory computer-readable medium of claim 15, wherein each of the interactive axes is either a foreground dimensional control or a background dimensional control, wherein displaying the multi-dimensional dataset comprises displaying only dimensions of the multi-dimensional dataset represented by the interactive axes that are foreground dimensional controls, and wherein displaying the updated version of the multi-dimensional dataset comprises displaying only dimensions of the multi-dimensional dataset represented by the interactive axes that are foreground dimensional controls.

19. The non-transitory computer-readable medium of claim 15, wherein the one or more modifications also involve:

receiving, by way of the graphical user interface, specification of a filter to apply to a particular axis of the interactive axes, wherein the filter is associated with one or more attributes of a particular dimension of the multi-dimensional dataset represented by the particular axis; and filtering the particular dimension of the multi-dimensional dataset by the one or more attributes.

20. A method comprising:

obtaining, by a computing device, a multi-dimensional dataset;

generating, by the computing device, a first arrangement of a graph, wherein the graph represents dimensions of the multi-dimensional dataset with respective interactive axes extending radially from a central point of the graph;

displaying, on a screen of the computing device, a graphical user interface including the first arrangement of the graph;

receiving, by way of the graphical user interface, a selection of one or more of the interactive axes and one or more modifications to the selected interactive axes;

performing, by the computing device, operations on the dimensions of the multi-dimensional dataset that correspond to the selected interactive axes, wherein the operations are specified by the one or more modifications;

generating, by the computing device, a second arrangement of the graph, wherein the selected interactive axes are updated to visually represent the one or more of the interactive axes as modified; and displaying, on the screen of the computing device, the graphical user interface including the second arrangement of the graph.

* * * * *